(12) United States Patent
Vetrovec

(10) Patent No.: US 6,810,060 B2
(45) Date of Patent: Oct. 26, 2004

(54) HIGH-AVERAGE POWER ACTIVE MIRROR SOLID-STATE LASER WITH MULTIPLE SUBAPERTURES

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/782,788

(22) Filed: Feb. 13, 2001

(65) Prior Publication Data
US 2002/0110164 A1 Aug. 15, 2002

(51) Int. Cl.[7] ................................................ H01S 3/06
(52) U.S. Cl. .......................... 372/68; 372/66; 372/40; 372/35
(58) Field of Search ........................ 372/68, 66, 40, 372/35, 67, 34, 36

(56) References Cited

U.S. PATENT DOCUMENTS

| | | | |
|---|---|---|---|
| 3,579,142 A | * 5/1971 | Smiley | ........................... 372/7 |
| 3,631,362 A | 12/1971 | Almasi et al. | |
| 4,029,400 A | 6/1977 | Eitel | |
| 4,657,358 A | 4/1987 | Anthony et al. | |
| 4,837,771 A | 6/1989 | Baer | |
| 4,849,036 A | * 7/1989 | Powell et al. | ................. 156/99 |
| 4,944,580 A | 7/1990 | MacDonald Bruce G. et al. | |
| 5,335,237 A | 8/1994 | Zapata | |
| 5,441,803 A | 8/1995 | Meissner | |
| 5,553,088 A | * 9/1996 | Brauch et al. | ................. 372/34 |
| 5,563,899 A | 10/1996 | Meissner et al. | |
| 5,579,333 A | 11/1996 | Neil et al. | |
| 5,610,751 A | 3/1997 | Sweeney et al. | |
| 5,661,738 A | 8/1997 | Yasui et al. | |
| 5,699,372 A | 12/1997 | Okazaki | |
| 5,703,893 A | 12/1997 | Komiyama et al. | |
| 5,796,761 A | 8/1998 | Injeyan et al. | |
| 5,832,015 A | 11/1998 | Goto et al. | |
| 5,846,638 A | 12/1998 | Meissner | |
| 5,856,996 A | 1/1999 | Durkin et al. | |
| 5,872,803 A | 2/1999 | Mori et al. | |
| 5,872,804 A | 2/1999 | Kan et al. | |
| 5,875,206 A | 2/1999 | Chang | |
| 5,903,583 A | * 5/1999 | Ullman et al. | ................. 372/35 |
| 5,936,984 A | 8/1999 | Meissner et al. | |

OTHER PUBLICATIONS

Department of Defense—Report of the High Energy Laser Executive Review Panel entitled "Department of Defense Laser Master Plan" dated Mar. 24. 2000.

Article entitled "Solid State Thin Disc Laser" by H. Hugel and W.L. Bohn from SPIE vol. 3574.

* cited by examiner

Primary Examiner—Jerome Jackson
Assistant Examiner—Matthew C Landau
(74) Attorney, Agent, or Firm—Harness Dickey & Pierce P.L.C.

(57) ABSTRACT

An apparatus and method for achieving ultrahigh-power output from a solid-state laser. The solid-state laser of the subject invention uses multiple disk-shaped laser gain media (subapertures) placed adjacent to each other to fill an optical aperture of an AMA module. In one preferred embodiment each of the laser gain media is provided with optical coatings for operation in the active mirror configuration. Furthermore, each of the laser gain media is hydrostatic pressure-clamped to a rigid, cooled substrate, which allows it to maintain a prescribed shape even when experiencing significant thermal load. A cooling medium can be provided to a heat exchanger internal to the substrate and/or flowed through the passages on the substrate surface, thereby directly cooling the laser gain medium.

28 Claims, 16 Drawing Sheets

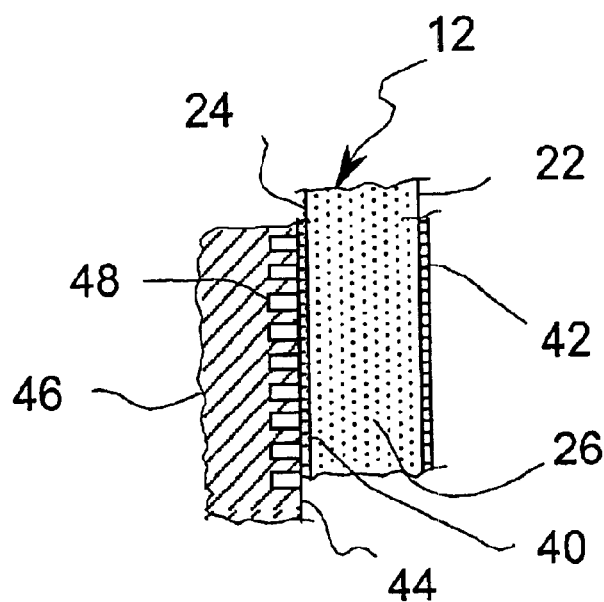
*Figure 4*
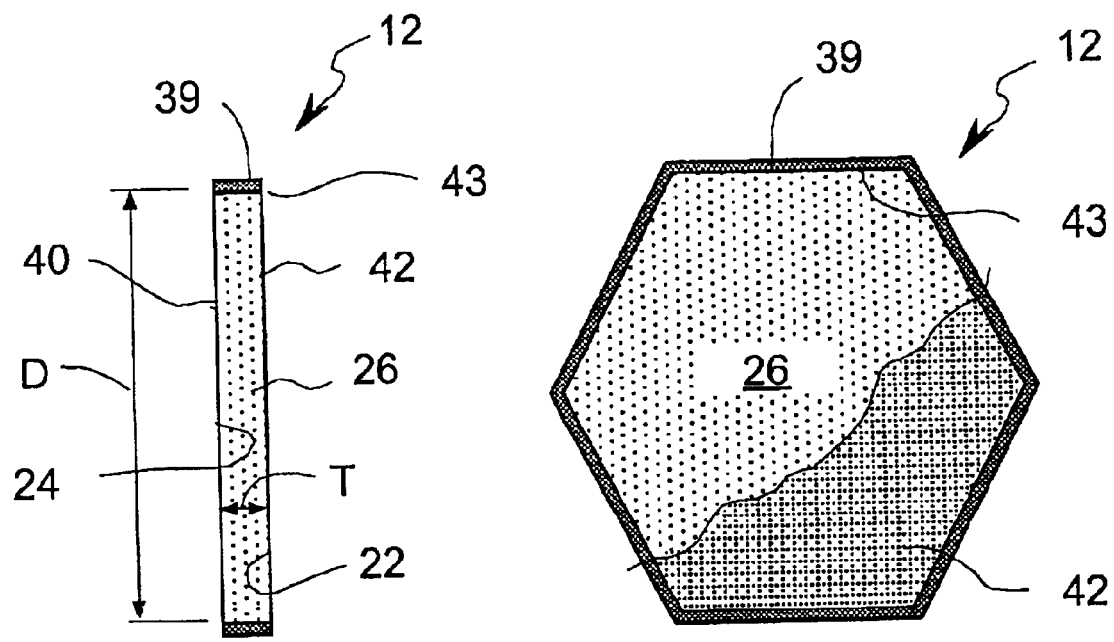
*Figure 5a*     *Figure 5b*

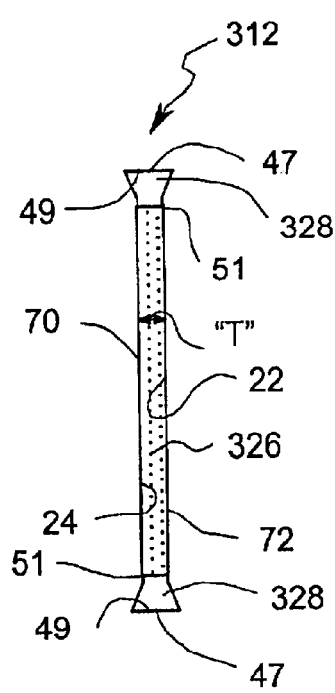 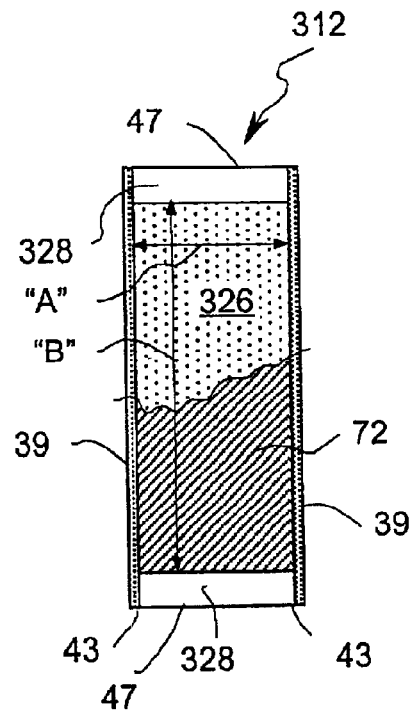
*Figure 13a*    *Figure 13b*
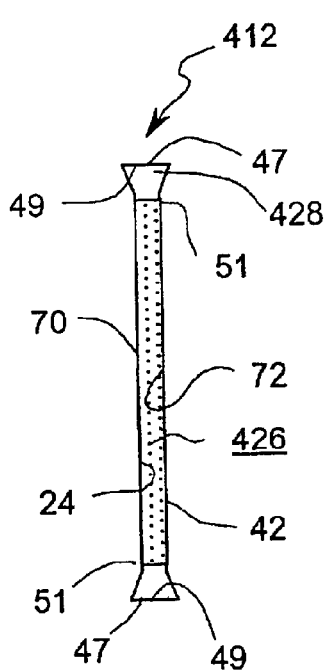 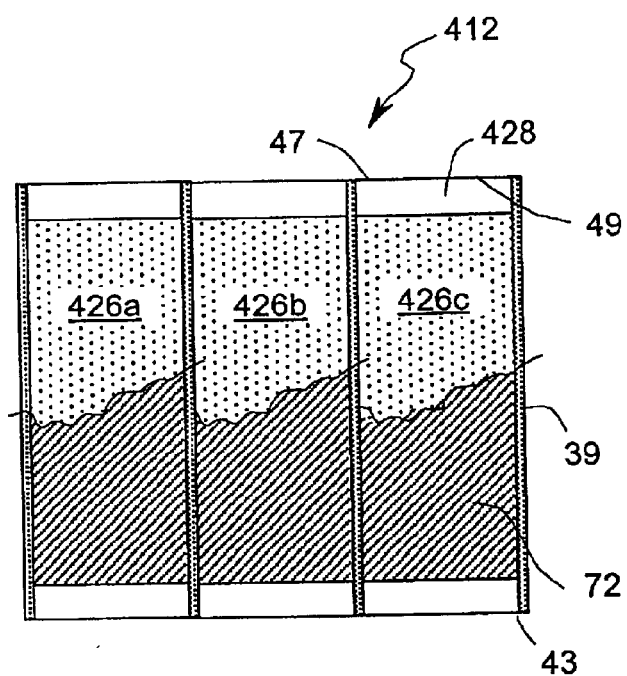
*Figure 14a*    *Figure 14b*

HIGH-AVERAGE POWER ACTIVE MIRROR SOLID-STATE LASER WITH MULTIPLE SUBAPERTURES

FIELD OF THE INVENTION

The present invention relates to laser amplifiers, and more particularly to a solid-state laser incorporating multiple disk-shaped laser gain media (subapertures) placed adjacent to each other to fill an optical aperture of an AMA module.

BACKGROUND OF THE INVENTION

Thermomechanical effects present a major challenge to scaling of a solid-state laser (SSL) to high-average power (HAP). In particular, optical distortions caused by transverse temperature gradients (i.e., perpendicular to laser beam axis) are known to degrade beam quality, which may render the beam useless for many important applications. A class of SSL known as "active mirror amplifier" (AMA) originally disclosed by Almasi et al. in U.S. Pat. No. 3,631,362 (1971) has shown effective reduction of transverse temperature gradients and demonstrated generation of laser output with very good beam quality. See, for example, J. Abate et al., "Active Mirror: A Large-Aperture Medium Repetition Rate Nd:Glass Amplifier," Appl. Opt. Vol. 20, no. 2, 351–361 (1981) and D. C. Brown et al., "Active-Mirror Amplifier: Progress and Prospects," IEEE J. of Quant. Electr., vol. 17., no. 9, 1755–1765 (1981). In the classical AMA concept, a large aspect ratio, edge-suspended, Nd-Glass disk (or slab) several centimeters thick is pumped by flashlamps and liquid-cooled on the back face. However, this device is not suitable for operation at HAP because of poor heat removal and resulting thermo-mechanical distortion of the edge-suspended disk. Previous attempts to mitigate these problems and increase the average power output of AMA have been met with encouraging but limited results. In recent years, the AMA concept has been a revived in the form of a "thin disk laser" introduced by Brauch et al. in U.S. Pat. No. 5,553,088 (1996). The thin disk laser uses a gain medium disk several millimeters in diameter and 200–400 micrometers in thickness soldered to a heat sink. See, for example A. Giesen et al., "Scalable Concept For Diode-pumped High-power Lasers," Appl. Phys. B vol. 58, 365–372 (1994). A diode pumped Yb:YAG thin disk laser has demonstrated laser outputs approaching 1 kW average power and with beam quality around 12 times the diffraction limit. See for example, C. Stewen et al., "1-kW CW Thin Disk Laser," IEEE J. of Selected Topics in Quant. Electr., vol. 6, no. 4, 650–657 (July/August 2000). Another variant of the thin disk laser can be found in L. Zapata et al., "Composite Thin-disk Laser Scalable To 100 kW Average Power Output and Beyond," in Technical Digest from the Solid-State and Diode Laser Technology Review held in Albuquerque, N. Mex., Jun. 5–8, 2000.

The applicant's first co-pending patent application Ser. No. 99/505,399 entitled "Active Mirror Amplifier System and Method for a High-Average Power Laser System", which is hereby made a part hereof and incorporated herein by reference, discloses a new AMA concept suitable for operation at high-average power. This invention uses a large aperture laser gain medium disk about 2.5 mm in thickness and with a diameter typically between 5 and 15 cm, mounted on a rigid, cooled substrate. Note that the disk thickness in this AMA concept is about 10 times less than in the classical AMA and about 10 times more than in the thin disk laser. The substrate contains a heat exchanger and microchannels on the surface facing the laser medium disk. The disk is attached to the substrate by a hydrostatic pressure differential between the surrounding atmosphere and the gas or liquid medium in the microchannels. This novel approach permits thermal expansion of the laser medium disk in the transverse direction while maintaining a thermally loaded disk in a flat condition. The above-mentioned patent application Ser. No. 99/505,399 teaches two principal methods for providing pump radiation into the AMA disk, namely: 1) through the large (front or back) face of the disk, or 2) through the sides (edges) of the disk. AMA using the former method, which is often referred to as "face pumping," is further elaborated, for example, in J. Vetrovec, "Active mirror amplifier for high-average power," to be published in SPIE vol. 4270 (2000). FIG. 1 shows such a face-pumped AMA where pump radiation from a diode array is injected into the laser gain medium through an optically transparent substrate.

The applicant's second co-pending patent application, entitled "Side-Pumped Active Mirror Solid-State Laser for High-Average Power", Docket No. 00-173 filed on Jan. 22, 2001, which is hereby made a part hereof and incorporated herein by reference, discloses a composite AMA wherein optical pump radiation is injected into the peripheral edge of a composite gain medium disk. Side-pumping takes advantage of the long absorption path (approximately the same dimension as disk diameter), which permits doping the disk with a reduced concentration of lasant ions and a corresponding reduction in pump radiation intensity. The composite gain medium is formed by bonding an undoped optical medium to the peripheral edges of the laser gain medium disk. This construction facilitates improved coupling between the source of optical pump radiation and the laser gain medium, as well as concentration of optical pump radiation, cooling of the peripheral edge of the laser gain medium disk, and providing a trap for amplified spontaneous emission (ASE). In that invention, sources of optical pump radiation are placed around the perimeter of the composite gain medium. Tapered ducts may be disposed between the sources of optical pump radiation and the composite gain medium for the purpose of concentrating optical pump radiation. With the proper choice of laser gain medium doping, pump source divergence and geometry, a uniform laser gain is achieved across large portions of the gain medium.

The teachings of the two above-mentioned co-pending patent applications of the Applicant provide numerous advantages over prior art SSL and allow generation of near diffraction limited laser output at very high-average power from a relatively small device. However, these co-pending patent applications disclose only AMA modules utilizing single monolithic laser gain medium covering the device optical aperture. The term "aperture" as used herein is the one typically used in optics, namely: "The diameter of the objective of a telescope or other optical instrument", as defined in McGraw-Hill Dictionary of Scientific and Technical Terms, $4^{th}$ edition, published by McGraw-Hill, Inc.

To obtain higher average laser power from an AMA module, it is beneficial to increase the size of the optical aperture. However, the size of a single monolithic laser gain medium disk required to fill the optical aperture is limited by available fabrication technology. In particular, YAG crystal boules can be reliably grown only to about 5 cm diameter and GGG crystals to about 15 cm diameter. The difficulties, limitations, and cost of growing large crystals pertinent to the subject invention are discussed, for example, in D. Dawnes, "Nd:YAG—The Versatile High-power Solid-state Laser Crystal," published in Industrial Laser Review in March 1995.

Another consideration associated with using large AMA disks is a tradeoff between transverse dimensions of the disk and the producible laser gain. In particular, a larger size AMA disk can produce higher average laser power but to avoid excessive ASE losses, this must be done with much lower gain than a comparably smaller AMA disk. This can be a significant limitation when optimizing an ultrahigh-average power system, where a very large number of AMA stages with monolithic apertures would be needed to meet a particular output power and gain requirements for efficient operation of a laser resonator.

SUMMARY OF THE INVENTION

The present invention provides an apparatus and method for achieving improved performance in a solid-state laser. The solid-state laser of the present invention uses multiple disk-shaped laser gain media (subapertures) placed adjacent to each other to fill an optical aperture of an AMA module. The perimeter of each disk may be circular, elliptical, rectangular, polygonal, or formed by linear segments, or a combination of linear segments and curves. Boundaries of adjacent disks are chosen so that gaps between disks are minimized and disks efficiently cover most of the AMA optical aperture. In the preferred embodiment each laser gain medium is provided with optical coatings for operation in the active mirror configuration. Furthermore, each laser gain medium is pressure-clamped to a rigid, cooled substrate. The substrate has a plurality of internal passages leading up to its contact surface with the optical gain medium. A hydrostatic pressure-clamping effect is generated by maintaining the passages at a substantially lower pressure than the pressure of the atmosphere in which the solid-state laser is immersed. A laser gain medium constrained in this fashion can maintain a prescribed shape even when experiencing significant thermal load. The substrate may be common to all disks, or several disks, or individual to one or more disks.

Pumping of the laser gain media to laser transition is accomplished by providing optical pump radiation either to the front or back faces of the disks or to selected portions of the peripheral edges of the disks. The laser gain medium disks are preferably of composite construction formed by attaching undoped optical medium and/or ASE absorption cladding and/or ASE absorption coating to the peripheral edges of the laser gain medium disk. When an undoped optical medium is used, it is adapted for receiving optical pump radiation and transporting it into the laser gain medium. A preferred method of attaching the undoped optical medium to the laser gain medium is by optical contacting followed by heat treatment. ASE absorption cladding can be either diffusion bonded or adhesive bonded. Alternately, an ASE absorption coating can be used in lieu of cladding.

The use of a composite gain medium provides several advantages in the present invention. First, the undoped optical medium facilitates improved coupling between the source of optical pump radiation and the laser gain medium. Second, the undoped optical medium may additionally concentrate optical pump radiation by having a converging (i.e., tapered) profile and/or curved input surfaces. Third, the undoped optical medium cools the peripheral edge of the laser gain medium disk by drawing heat therefrom. Fourth, the undoped optical medium serves as a trap for ASE rays, thereby significantly reducing feedback to parasitic oscillations. ASE absorption cladding and ASE absorption coating also significantly reduce the feedback to parasitic oscillations.

In one preferred embodiment a plurality of sources of optical pump radiation are placed so as to inject pump radiation into the front or back faces of the laser gain medium disks. In the latter case, pump radiation is injected through the substrate on which the disks are mounted and which, for this purpose, is made of optically transparent material. Pump source intensity may be varied across the aperture to counter the effects of laser gain saturation and, thereby, produce a more uniform saturated laser gain. The cooling effect too may be correspondingly varied across the aperture to reduce transverse temperature gradients. In another preferred embodiment, sources of optical pump radiation are placed so as to inject pump radiation into selected perimeter edges of the laser gain media disks. Regardless of the method of injecting optical pump radiation, tapered ducts for concentration of optical pump radiation may be disposed between the sources and the laser gain medium. Such ducts can be either made of solid optical material or be constructed as hollow shells with reflecting internal surfaces, which can be either empty or filled with transparent liquid. An additional concentration of optical pump radiation can be achieved with either microlenses integrated into the optical pump sources and/or lenses placed in front of the emitting surface of the sources.

A cooling medium can be provided to a heat exchanger internal to the substrate and/or flowed through the passages on the substrate surface, thereby directly wetting the laser gain medium. Preferably, coolant fluid connections to the substrate are provided by pressure-balanced fluid transfer tubes permitting small axial and transverse movements. Such fluid transfer tubes isolate hydraulic pressure loads from the substrate and coolant supply so that alignment of the substrate will not be affected. In addition, the fluid transfer tubes balance the hydraulic forces caused by the coolant pressure so that the substrate will not have any significant load placed upon it to interfere with its operation.

The invention can be used as a building block for the construction of laser oscillators as well as laser amplifiers operating in a pulsed (storage) mode, continuous wave (cw) mode, and quasi-cw (long pulse) mode.

The various advantages of the present invention will become apparent to one of ordinary skill in the art by reading the following specification and sub-joined claims and by referencing the following drawings, in which:

FIG. 4 is an enlarged view of portion 4 of the AMA in FIG. 2;

FIG. 5a is a side cross sectional view of the composite gain medium assembly shown in FIG. 2;

FIG. 5b is a front view of the composite gain medium assembly shown in FIG. 2;

FIG. 13a is a side cross sectional view of another alternative composite gain medium assembly which can be practiced with the present invention;

Figures 15A, 15B:
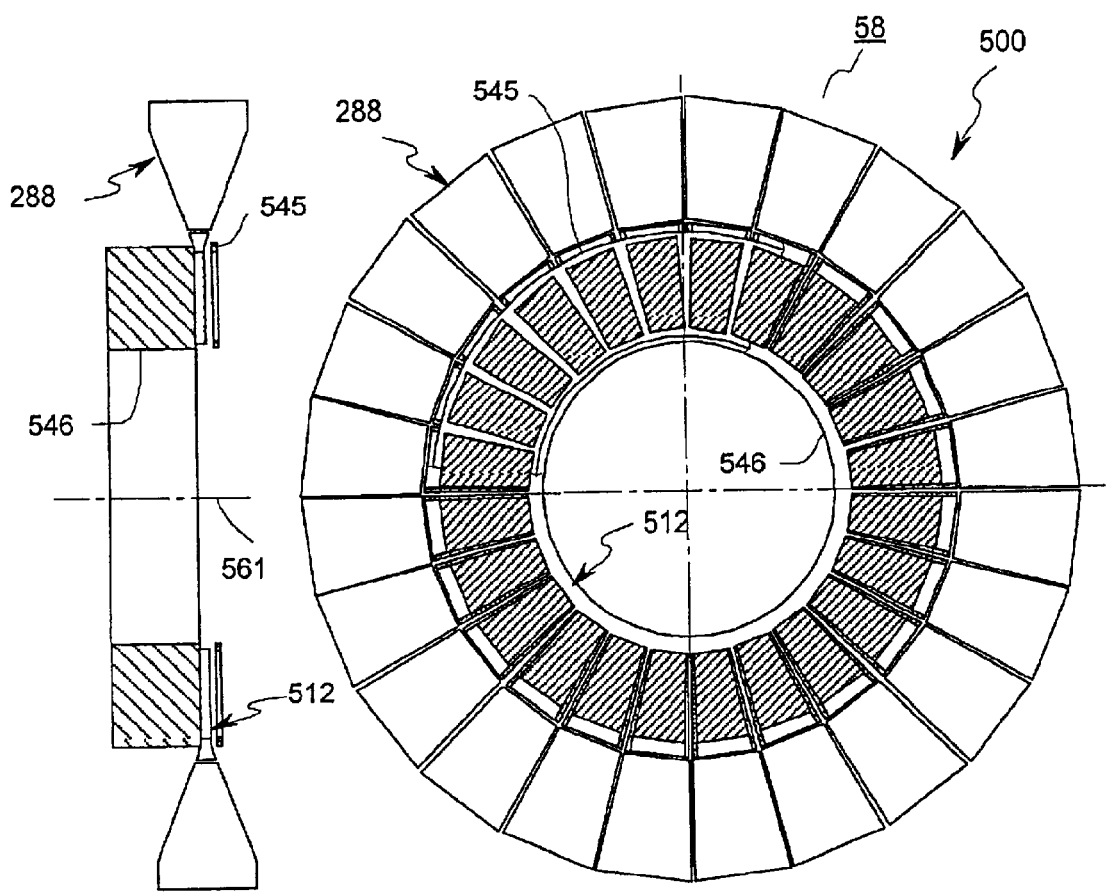
Figure 16A:
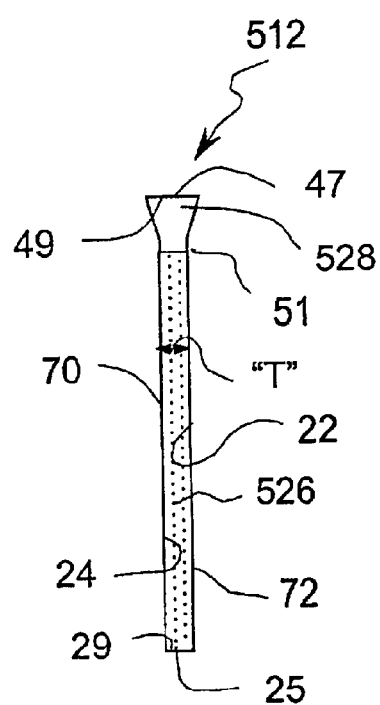
Figure 16B:
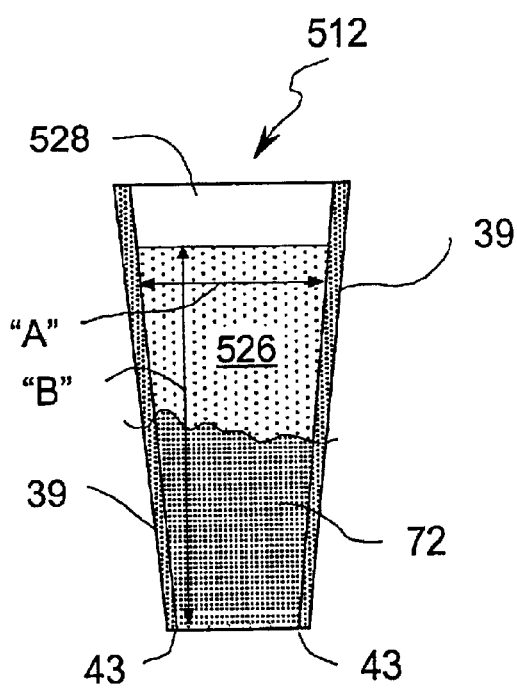
Figure 17:
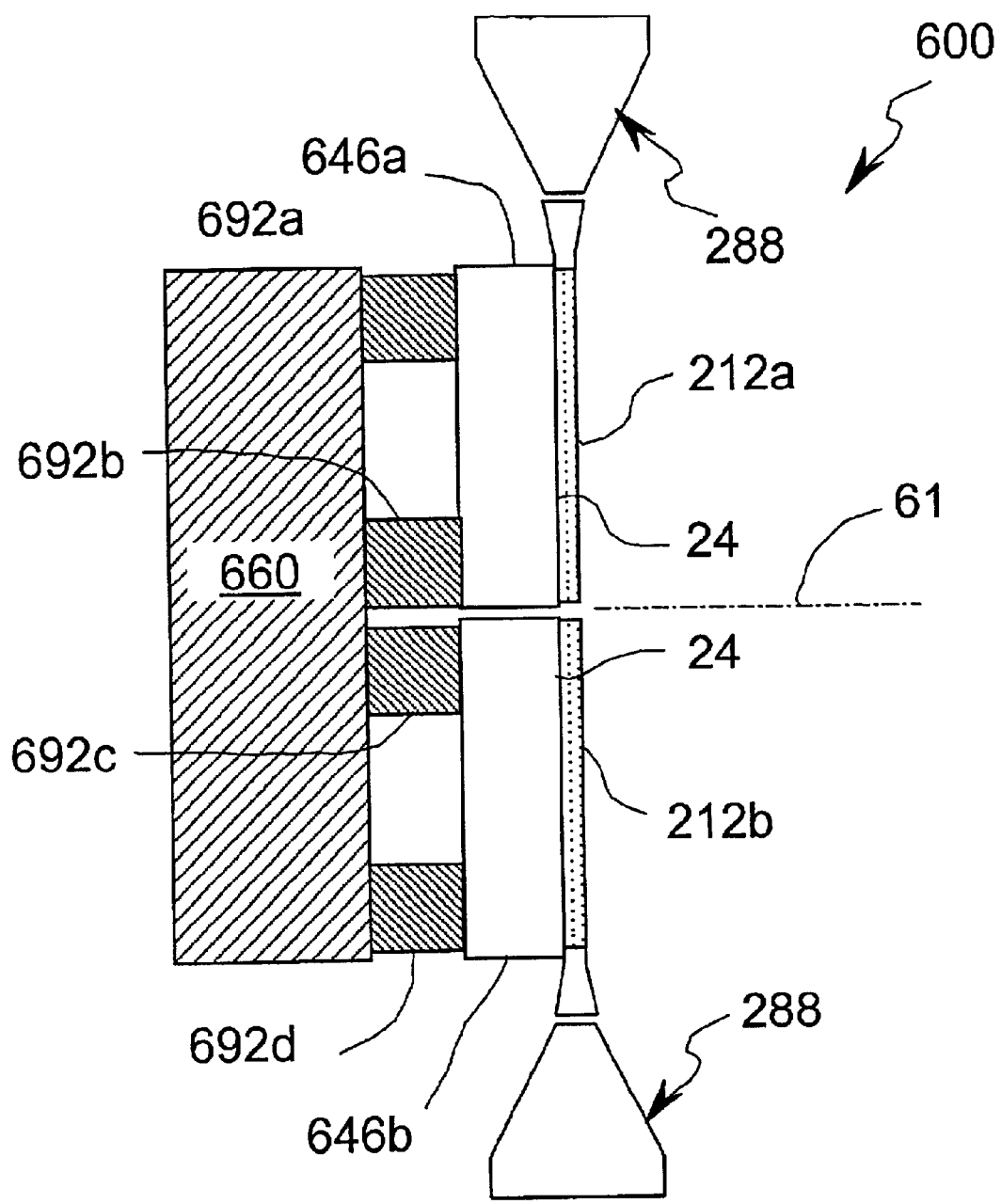
Figure 18:
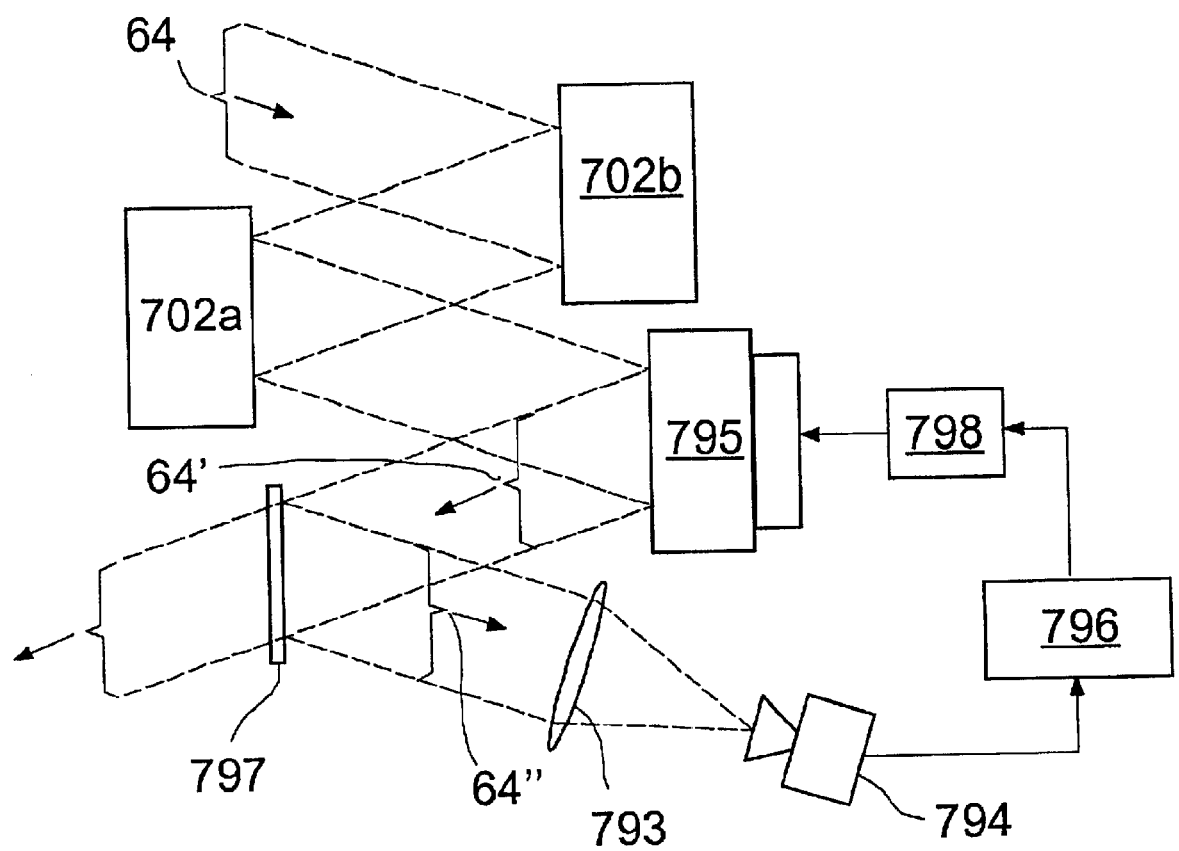
Figure 19:
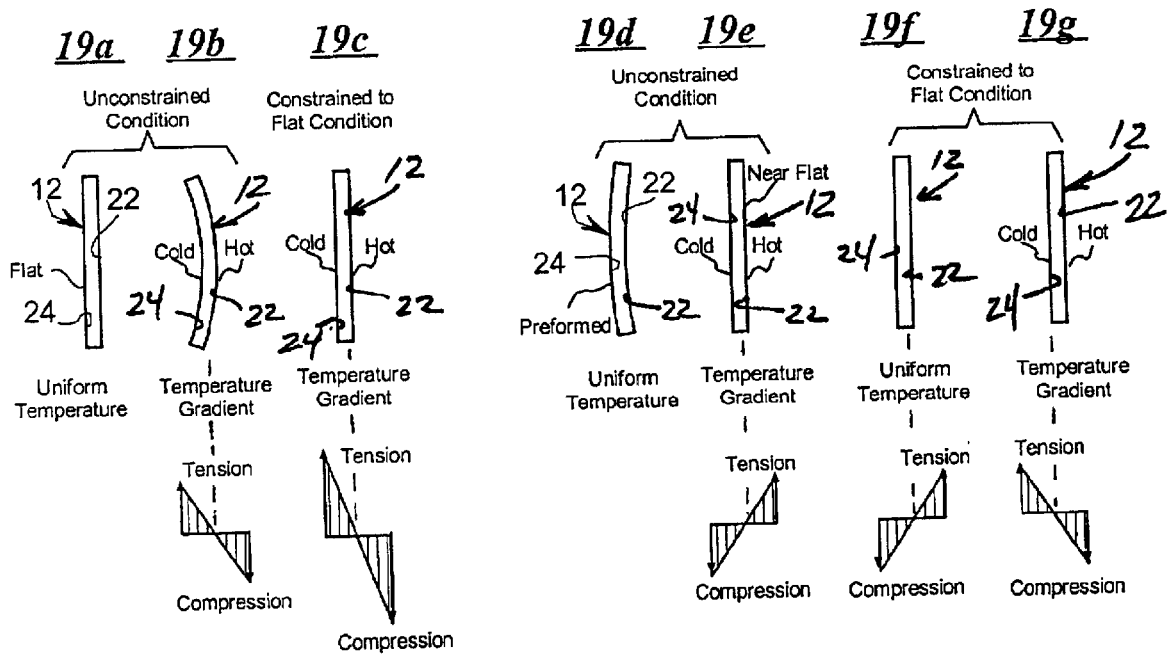

FIG. 13b a is a front view of the gain medium assembly of FIG. 13a;

FIG. 14a is a side-cross sectional view of yet another alternative composite gain medium assembly which can be practiced with the present invention;

FIG. 14b is a front view of the composite gain medium assembly of FIG. 14a;

FIG. 15a is a side cross sectional view of a variation to the third preferred embodiment having a composite gain media arranged in an annular array;

FIG. 15b is a front view of a variation to the third preferred embodiment having the composite gain media arranged in an annular array;

FIG. 16a is a side cross sectional view of the composite gain medium shown in FIG. 15;

FIG. 16b a is a front view of the composite gain medium shown in FIG. 15;

FIG. 17 is an alternative preferred embodiment of the present invention with a segmented substrate having individual adjustment means;

FIG. 18 is a schematic view of a closed loop wavefront correction system using a deformable mirror;

FIG. 19a is a side view of a composite gain medium disk in an unconstrained condition prior to reaching an operating temperature;

FIG. 19b is a view of the composite gain medium disk of FIG. 19a in an unconstrained condition which it would otherwise assume when reaching an operating temperature, and illustrating the tensile and compressive stresses on the disk when it is unconstrained and at an operating temperature;

FIG. 19c is a view of the composite gain medium disk of FIG. 19b constrained to a flat condition while at an operating temperature, illustrating the increased tensile and compressive forces;

FIG. 19d is a side view of a pre-formed, unconstrained composite gain medium disk prior to being heated;

FIG. 19e is a view of the pre-formed composite gain medium disk of FIG. 19d after same has been heated, and illustrating the magnitudes of the tensile and compressive forces it experiences;

FIG. 19f is a side view of a composite gain medium disk in a constrained condition prior to being heated, and illustrating the tensile and compressive forces experienced by the disk; and FIG. 19g is a side view of the composite gain medium disk in a constrained orientation after being heated, and illustrating the reduction and reversal of tensile and compressive forces experienced by the disk when constrained at an operating temperature;

DETAILED DESCRIPTION OF THE PREFERRED EMBODIMENTS

As used herein, "Laser gain medium" refers to an optical material having a host lattice doped with suitable ions, which in the subject invention are pumped to a laser transition. Although this invention is not limited to a specific lasing material or a specific pump source, the preferred host lattice materials are yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass and sapphire. Suitable dopants for this lasing medium include Ti, Cu, Co, Ni, Cr, Ce, Pr, Nd, Sm, Eu, Gd, Tb, Dy, Ho, Er, Tm, and Yb. The optical pump source is selected based on the absorption characteristics of the selected laser gain medium. Preferably, semiconductor diode lasers are used for the optical pump source.

"Undoped optical medium" refers to an optical material which is preferably substantially free of substances than can absorb optical pump radiation. Preferably, the undoped medium is of the same host material as the laser gain medium but it is not doped. However, in some variants of the invention, undoped optical medium may be slightly doped with ions which may absorb optical radiation at the wavelengths of the optical pump and/or the laser gain transition, but are not pumped to a population inversion. Undoped optical medium may be bonded to selected surfaces of the laser gain medium. Such bond must be highly transparent at the laser wavelength as well as at pump wavelengths. The refractive index of the undoped optical medium and the bond are preferably closely matched to that of the laser gain medium. A suitable bond can be produced by fusion bonding, diffusion bonding or optical contacting followed by heat treatment. Preferred optical contacting followed by heat treatment, for example, is disclosed by Meissner in U.S. Pat. Nos. 5,441,803, 5,563,899, and 5,846,638 and is commercially available from Onyx Optics in Dublin, Calif.

"ASE absorption cladding" refers to an optical material capable of absorbing optical radiation at the wavelengths of one or more laser transitions in the laser gain medium. Preferred materials include glass (such as phosphate glass, silicate glass, fluorophosphate glass), crystals, ceramics, RTV® rubber, epoxy polymers or laminate of these materials. These materials may be also doped with absorbing ions. For example, ions which absorb radiation at 1.06 micrometers are primarily $Cu^{2+}$, $Sm^{3+}$, $Dy^{3+}$, $Cr^{4+}$, and $V^{3+}$, $Cu^{2+}$. For example, ASE absorption claddings based on polymeric compounds attached to a laser gain medium with adhesives is disclosed by Powell et al., in U.S. Pat. No. 4,849,036. ASE absorption cladding should also have a refractive index closely matched to that of the laser medium to prevent reflection from edge-cladding interface. In addition, ASE absorption cladding should have a coefficient of thermal expansion closely matched to that of the laser gain medium to reduce thermal stresses. ASE absorption cladding may be bonded to selected surfaces of the laser gain medium by an adhesive, fusion bond, diffusion bond, optical contacting followed by heat treatment (as for example disclosed by already noted Meissner), or other suitable means. Such bond must be highly transparent at the laser wavelength and have its refractive index closely matched to that of the laser gain medium.

"ASE absorption coating" refers to a thin film bonded onto selected surfaces of the laser gain medium and having the capability to absorb optical radiation at the wavelengths of one or more laser transitions in the laser gain medium. Such a thin film may be a combination of materials which have indices of refraction which are greater than the index of refraction of the laser gain medium. Preferred materials include germanium, silicon, gold, silver, silica, diamond, graphite, dried graphite ink, and some semiconductors and halides. Suitable ASE absorption coating may be produced and applied in accordance with teachings of Zapata in the U.S. Pat. No. 5,335,237.

"Composite gain medium" refers to an assembly comprising at least one component made of laser gain medium material, and at least one component made of the following group of materials: 1) undoped optical medium, 2) ASE absorption cladding, and 3) ASE absorption coating. In addition, the gain medium assembly may have reflective, antireflective, and dichroic coatings as appropriate for operation in the active mirror mode.

"Optical aperture" refers to the maximum transverse dimension of a laser beam which can be received, amplified, and transmitted by an AMA module.

"Optical subaperture" refers to a part of the optical aperture where a portion of the laser beam can be received, amplified and transmitted by a single AMA composite gain medium.

"Optical pump source" refers to a source of optical radiation suitable for pumping the laser gain medium to a laser transition. A preferred optical pump source is an array of semiconductor lasers commonly known as laser diodes. The optical pump source used with the present invention may incorporate large quantities of laser diodes. Such laser diodes may be arranged in one, two or three dimensional arrays.

Amplified Spontaneous Emission (ASE)

ASE is a phenomenon wherein spontaneously emitted photons traverse the laser gain medium and are amplified before they depart from the gain medium. The favorable condition for ASE is a combination of high gain and a long path for the spontaneously emitted photons. ASE depopulates the upper energy level in excited laser gain medium and robs the laser of its power. Furthermore, reflection of ASE photons at gain medium boundaries may provide feedback for parasitic oscillations that aggravate the loss of laser power. If unchecked, ASE may become large enough to deplete the upper level inversion in high-gain laser amplifiers. Experimental data suggests that in q-switched rod amplifiers ASE loss becomes significant when the product of gain and path-length becomes larger than 2.25 and parasitic oscillation loss becomes significant when the product is larger then 3.69. See, for example, N. P. Barnes et al., "Amplified Spontaneous emission—application to Nd:YAG lasers," IEEE J. of Quant. Electr., vol. 35, no. 1 (January 2000). Continuous wave (cw) or quasi-cw lasers are less susceptible to ASE losses because their upper level population (and hence the gain) is clamped.

Cladding of Laser Gain Medium for Suppression of Parasitic Oscillations

A traditional method for limiting ASE losses and suppressing parasitic oscillations in solid-state lasers is to reduce the possibility that ASE photons reaching the laser gain medium boundaries are reflected back into the medium. This can be accomplished by cladding selected boundaries of the gain medium with material that efficiently absorbs incident ASE photons. Such cladding must fulfill the following requirements: 1) be absorbing at laser wavelength and other strong spontaneous emission lines in the laser gain medium; 2) have a refractive index well matched to that of the laser medium to prevent reflection from edge-cladding interface; 3) should be free of devitrification, bubbles; 4) should have a thermal expansion coefficient well matched to that of the laser medium to prevent excessive thermal stresses; and 5) withstand without damage the heat generated by the optical pump source and ASE.

Another, recently introduced method for ASE loss control is to channel ASE rays out of selected laser gain medium surfaces into a trap from which they are prevented to return. See for example, R. J. Beach et al., "High-average Power Diode-pumped Yb:YAG Lasers," UCRL-JC-133848 available from the Technical Information Department of the Lawrence Livermore National Laboratory, U.S. Department of Energy.

Segmented Mirrors

Segmented mirrors are becoming popular for astronomical use since they are much less costly than their monolithic counterparts. See, for example T. E. Bell, "Electronics," IEEE Spectrum, August 1995, pp. 16–24. In a segmented mirror, a large aperture is constructed from multiple mirrors (segments) with smaller apertures (i.e., subapertures) tightly fitting together and covering the large aperture like tiles. Besides the savings associated with construction of smaller mirrors (rather than one large monolithic mirror), the individual segments can be independently positioned to perform wavefront correction as disclosed, for example, by McDonald et al. in U.S. Pat. No. 4,944,580. Segmented mirrors have been developed by a number of commercial vendors, including the assignee of the present application.

Detailed Description of the Preferred Embodiments

Figure 1:
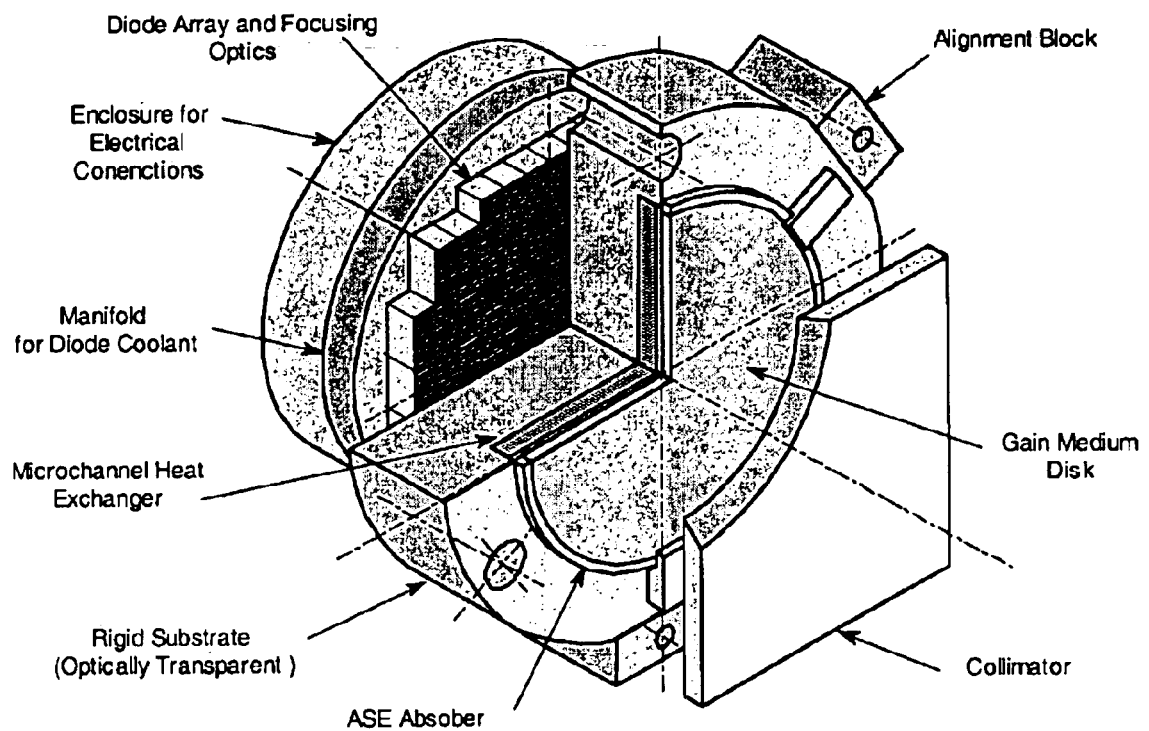
FIG. 1 shows a prior art Active Mirror Amplifier (AMA) for high-average power.
Figure 2:
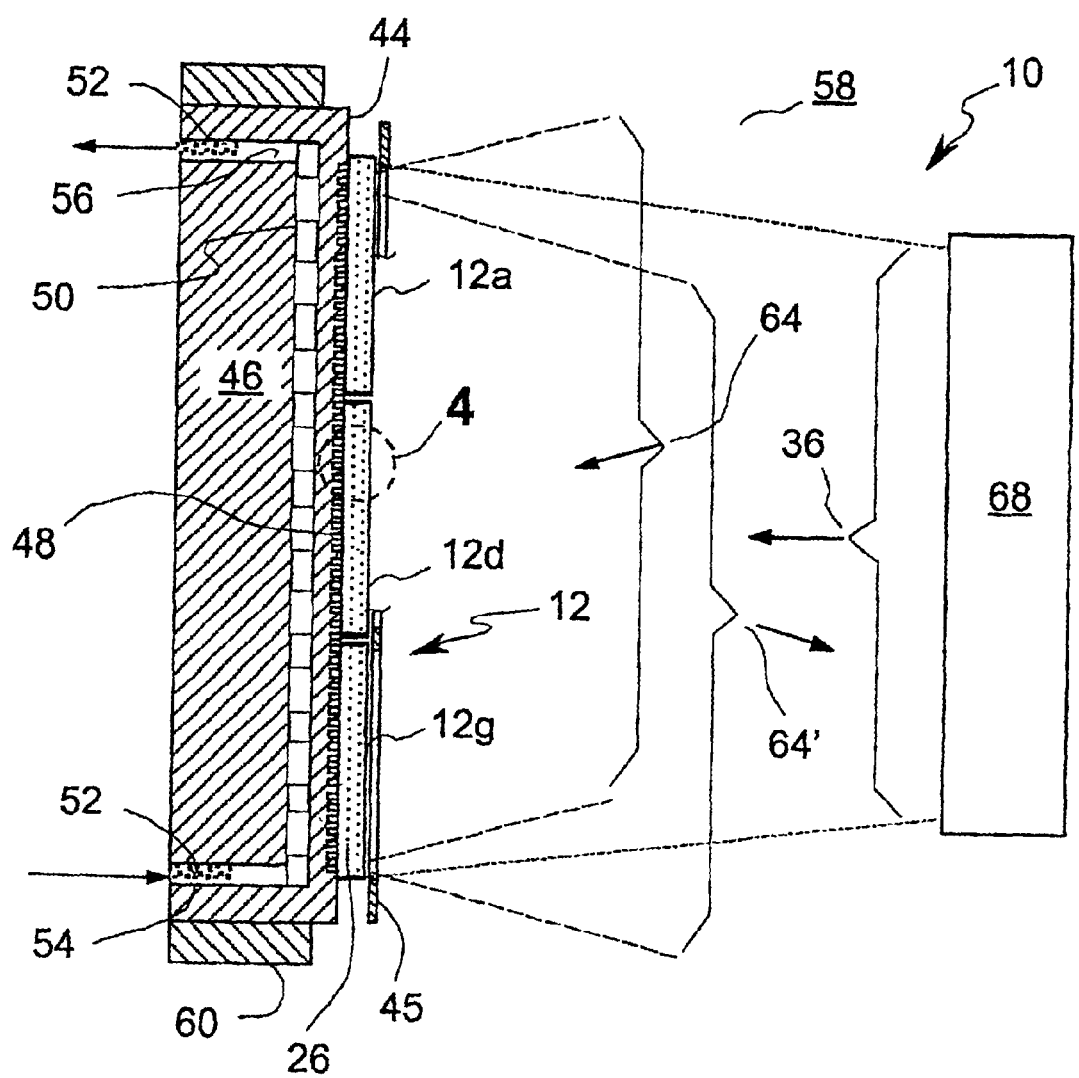
FIG. 2 is a side cross sectional view of a first preferred embodiment of an active mirror amplifier (AMA) module in accordance with the present invention.
Figure 3:
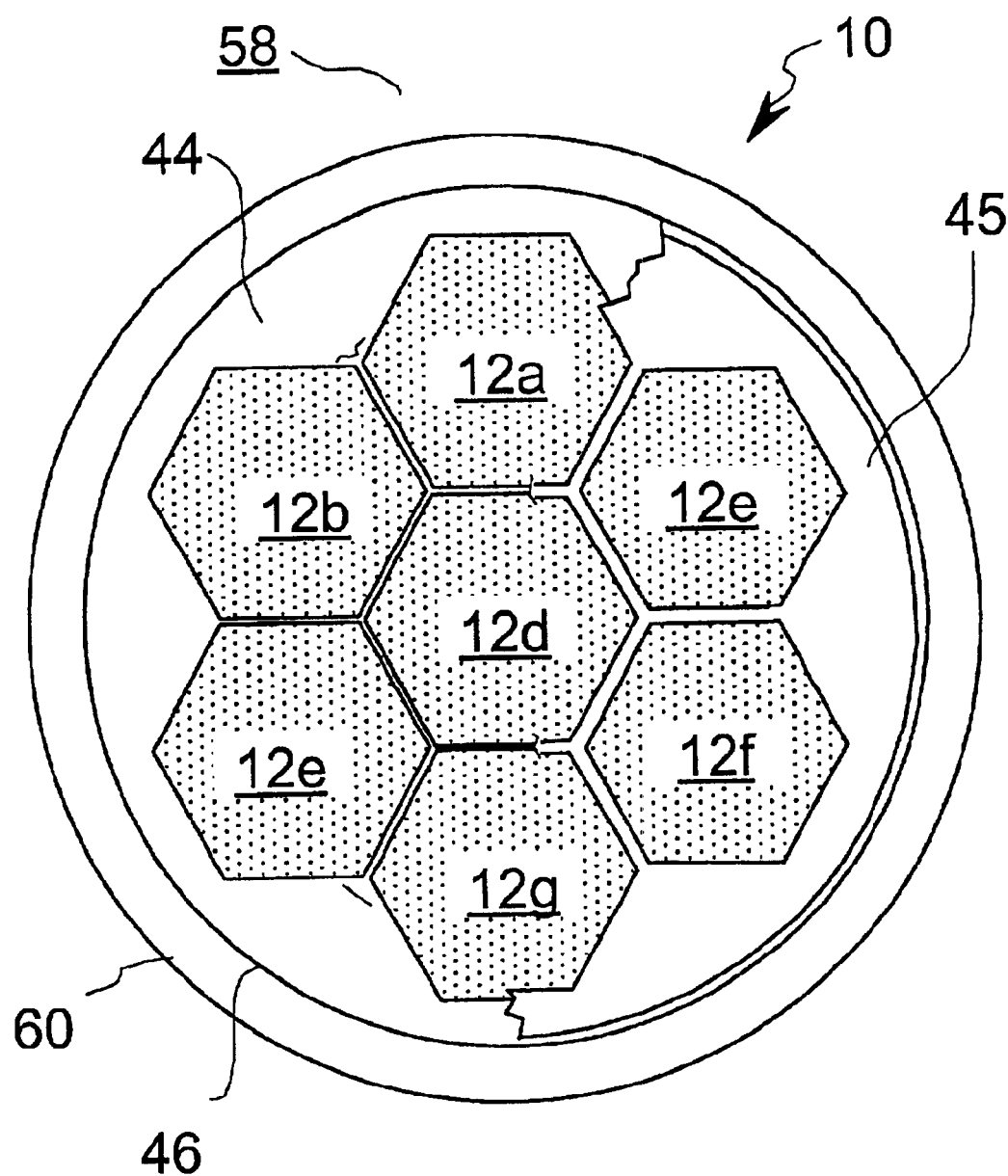
FIG. 3 is a front view of a first embodiment of the module of the present invention.

Referring to FIGS. 2 and 3, there is shown a solid-state active mirror amplifier module 10 in accordance with a first preferred embodiment of the present invention. This embodiment is suitable for injecting optical pump radiation into the front surface of the laser gain medium. The module 10 generally comprises a substrate 46, a plurality of composite gain media 12a–12g, and optical pump source 68. While in this embodiment seven laser gain media are used, it will be appreciated that a greater or lesser plurality of such media could be incorporated if desired.

Referring now to FIG. 4, the composite gain medium 12 has two planar, mutually parallel surfaces, a front surface 22 and a back surface 24, ground and polished to optical quality. In one preferred form shown in FIG. 3 the composite gain media 12a–12g each comprise a hexagonal disk. FIGS. 5a and 5b show the hexagonal disk 12 having a transverse dimension "D" several times greater than its thickness "T". Typically, the composite gain medium 12 may have a thickness ranging approximately from 1 to 10 millimeters and transverse dimensions ranging from about 10 millimeters to 150 millimeters. The composite gain medium 12 could just as readily be formed in other various shapes such as (but not limited to) polygonal shapes if desired. Preferably, the shape of the composite gain medium 12 is chosen so that multiple composite gain media can be placed next to each other with only small gaps therebetween. The preferred gap size is less than one mm. Furthermore, while the use of the term "disk" is used herein to reference this component, it will be appreciated that the composite composite gain medium 12 may take other forms which might not be viewed, strictly speaking, as a "disk". The perimeter of each gain medium disk 12a–12g may be circular, elliptical, rectangular, polygonal, or formed by linear segments, or a combination of linear segments and curves. Boundaries of adjacent disks 12a–12g are chosen so that gaps between disks are minimized and the disks efficiently cover most of the AMA optical aperture. Also, the number of composite gain media can be quite arbitrary, typically ranging from one (1) to several hundreds. The invention can also be practiced with several (and possibly all) composite gain media 12a–12g joined together along their peripheral edges to form a larger unit. Suitable methods of attachment include diffusion bonding and optical contacting followed by heat treatment.

Referring further to FIGS. 5a and 5b, the gain medium assembly 12 comprises a laser gain medium 26 and of ASE absorption cladding 39. The ASE absorption cladding 39 is attached around the perimeter of the laser gain medium 26 via optical bond 43. ASE absorption cladding material 39 is typically several millimeters thick and may be continuous or segmented. Furthermore, the plane of the optical bond 43 can be machined at a slight angle of 1–5% off normal to the large surfaces of the disk 12 to prevent direct reflection of incident ASE rays. Such a reflection is highly undesirable as it could provide feedback for parasitic oscillations in the laser gain medium 26. ASE absorption coating can be used in lieu of ASE absorption cladding 39.

Referring now to FIG. 4, the back planar surface 24 of the laser gain medium assembly 12 has an optical coating 40 with high reflectivity at a laser wavelength and optical pump wavelength. The front surface 22 has a dielectric optical coating 42 that is antireflective at the laser wavelength and optical pump wavelengths. The back surface 24 is in contact with the surface 44 (with coating 40 therebetween) of the cooled, rigid substrate 46. The surface 44 contains an array of interconnected low pressure microchannels 48 extending generally over, but not beyond, the contact areas between the composite gain medium assemblies 12a–12g and the substrate 46.

Referring now further to FIGS. 2 and 5, the substrate 46 contains a heat exchanger 50 which is located below the surface 44 and not connected to the low pressure microchannels 48. Coolant 52 is provided to the heat exchanger 50 by an inlet header 54 and drained therefrom by the outlet header 56. Internal distribution of the coolant 52 inside the heat exchanger 50 is such so as to provide a uniform cooling effect over a large part of the back surface 24 of the composite gain medium assembly 12. Suitable coolants may include liquids such as deionized water, alcohol, members from the Freon® family, liquid nitrogen, and liquid metals. Preferably, coolant fluid connections to the inlet header 54 and the outlet header 56 are provided by pressure-balanced, axially-movable fluid transfer tubes such as disclosed by Eitel in U.S. Pat. No. 4,029,400. Such fluid transfer tubes isolate hydraulic pressure loads from the substrate 46 and coolant supply so that alignment of substrate will not be affected. In addition, said fluid transfer tubes balance the hydraulic forces caused by the coolant pressure so that the substrate will not have any significant load placed upon to interfere with its operation. Furthermore, such fluid transfer tubes permit small axial and lateral adjustments of substrate 46 such as may be required to optically align the laser gain medium assembly 12 without affecting the operation of the fluid transfer tubes or placing forces on the substrate from the tubes.

The cooled substrate 46 is preferably made of a material with good thermal conductivity, such as copper, tungsten, molybdenum, sapphire, silicon carbide, or silicon, but other materials suitable for microchannel and heat exchanger fabrication can be used. The material of the substrate 46 can also be chosen to have a coefficient of thermal expansion close to that of the laser gain medium 26. Surface 44 of substrate 46 is machined flat and polished to optical quality except for penetrations created by the microchannels 48. Typical dimensions for the microchannels include a width of about 0.005 to 0.040 inch and a cross sectional area of about 0.000025 inch2–0.0016 inch2 (0.00016125 cm2–0.01032 cm2). Microchannels 48 preferably occupy about 50% of the contact area between surface 44 of substrate 46 and back surface 24 of laser gain medium disk 26. The microchannels 48 may also be formed in a variety of cross-sectional shapes, but preferably have a generally square cross-sectional shape. The thickness of the substrate 46 is chosen to provide mechanical rigidity necessary to ensure that the surface 44 remains optically flat under operational conditions.

When optically flat surfaces are brought into contact, they may become bonded even without bonding agents. Such bonds can be attributed to Van der Waals forces of attraction acting at opposing contact points and surfaces. Such bonding remains stable as long as the components of the composite are not subjected to temperature gradients that cause non-uniform thermal expansion, and resultant stress exceed this bond strength. However, the bond may be also broken by inserting a strong thin object, for example a razor blade, between the optically contacted surfaces. Debonding also results when liquids diffuse into the interface from the edge which constitutes the bond line. In the subject invention a positive contact between the back surface 24 of composite gain medium assembly 12a–12g and surface 44 of the substrate 46 is maintained by a pressure differential between the higher pressure of the atmosphere 58 surrounding the active mirror module 10 and the lower pressure inside the microchannels 48. The microchannels 48 are maintained at low pressure, possibly under vacuum. The pressure differential to so maintain the surfaces 24 and 44 when the gain medium assembly 12 is simultaneously subjected to internal heating and surface cooling is typically several tens of PSI. Such a continuous contact ensures that the back surface 24 will remain optically flat even when gain medium assembly 12 experiences significant thermal load. The continuous contact between surface 24 and surface 44 (with coating 40 therebetween) further facilitates the conductive transfer of heat from the laser gain medium 26 to substrate 46. The substrate 46 may be further installed into an optical mount 60 to facilitate easy positioning and alignment. The contact between the optically flat surfaces 24 and 44 (with coating 40 therebetween) provides a sufficient seal that prevents the atmosphere 58 from significantly leaking into the microchannels 48.

Referring now further to FIGS. 2 and 4, during lasing, optical pump source 68, produces and directs collimated optical pump radiation 36 into the front surface 22 of the gain medium assembly 12. During passage through the laser gain medium 26 (generally in a direction normal to the surface 22) the optical pump radiation 36 is gradually absorbed. This absorption process follows Beer's law: $I(X) = I0 \exp(-ax)$, where "x" is the distance into absorbing medium, "a" is the absorption coefficient, "I0" is the initial intensity of pump radiation, and "I(X)" is pump radiation intensity after traveling distance "x" in the absorbing medium. The fraction of pump radiation 36 not absorbed after the first pass thorough the laser gain medium 26 is reflected from the coating 40 and makes a second pass through the laser gain medium 26, this time in a generally reverse direction. Preferably, the material of laser gain medium 26 is doped with absorbing laser ion species so that 90% or more of incident pump radiation 36 is absorbed in two passes through the laser gain medium 26.

Optical pump radiation 36 absorbed by the laser gain medium 26 pumps the dopant species therein to a laser transition. This allows the laser gain medium disk 26 to serve as an amplifier of coherent optical radiation. The incident laser beam 64, having approximately the same footprint as the transverse shape of the array of composite gain media 12a–12g covering the aperture of AMA module 10, is directed into the laser gain medium 26 at a generally normal incidence through front surface 22 and is amplified until it reaches the coating 40. On reflection from coating 40, the laser beam passes through the laser gain medium 26 again in a generally reverse direction. The amplified laser beam 64' exits the laser gain medium 26 in a direction generally normal to the front surface 22. The intensity profile of laser beam 64 may produce a non-uniform saturation of the laser gain across the aperture. Such non-uniformity in laser gain can be at least partially corrected by appropriately varying the intensity of pump source 68 across the aperture of AMA module 10. Such variation in pump source intensity can be applied dynamically. The cooling effect provided by heat exchanger 50 can also be varied across the aperture if desired.

Waste heat dissipated in the laser gain medium 26 is conducted to back surface 24 and through the coating 40, and transferred to surface 44 of the substrate 46 from which it is conducted to the heat exchanger 50. Because the contact surfaces 24 and 44 are of optical quality and are maintained in good contact by the pressure provided by the atmosphere 58, thermal resistance of the contact is very small. Thus the waste heat can be efficiently removed from the laser gain medium 26. A mask 45 is located over the ASE absorption cladding 39 and the gap between adjacent composite gain media 12 to avoid exposure to pump radiation 36 and laser radiation 64, thereby preventing the risk of consequential thermal damage. Preferably, such mask should be highly absorptive at the laser and pump wavelengths and may incorporate cooling channels to effectively dissipate absorbed heat.

A variation of the first preferred embodiment of the active mirror amplifier is suitable for operation at increased optical power density. Referring again to FIGS. 2 and 5, in this variation of the invention, the internal heat exchanger 50 inside substrate 46 may be omitted and the coolant 52 is provided to microchannels 48 and allowed to directly wet large portions of the back surface 24 of the gain medium assembly 12. In this fashion heat generated in the laser gain medium 26 is conducted through the surface 24 and the optical coating 40 directly into the coolant 52. Coolant 52 is introduced into the microchannels 48 so as to provide a uniform cooling effect over a large part of the back surface 24 of all the gain medium assemblies 12a–12g. Coolant pressure is substantially lower than the pressure of atmosphere 58 to assure a positive attachment of the gain medium assemblies 12a–12g to the substrate 46. In this variant of the invention, heat generated in the gain medium assembly 12 is conducted through the surface 24 and the optical coating 40 directly into the coolant 52. This approach provides an even more enhanced cooling effect over the configuration in FIG. 2, wherein heat must be conducted to the heat exchanger 50 located inside the substrate 46.

Figure 6:
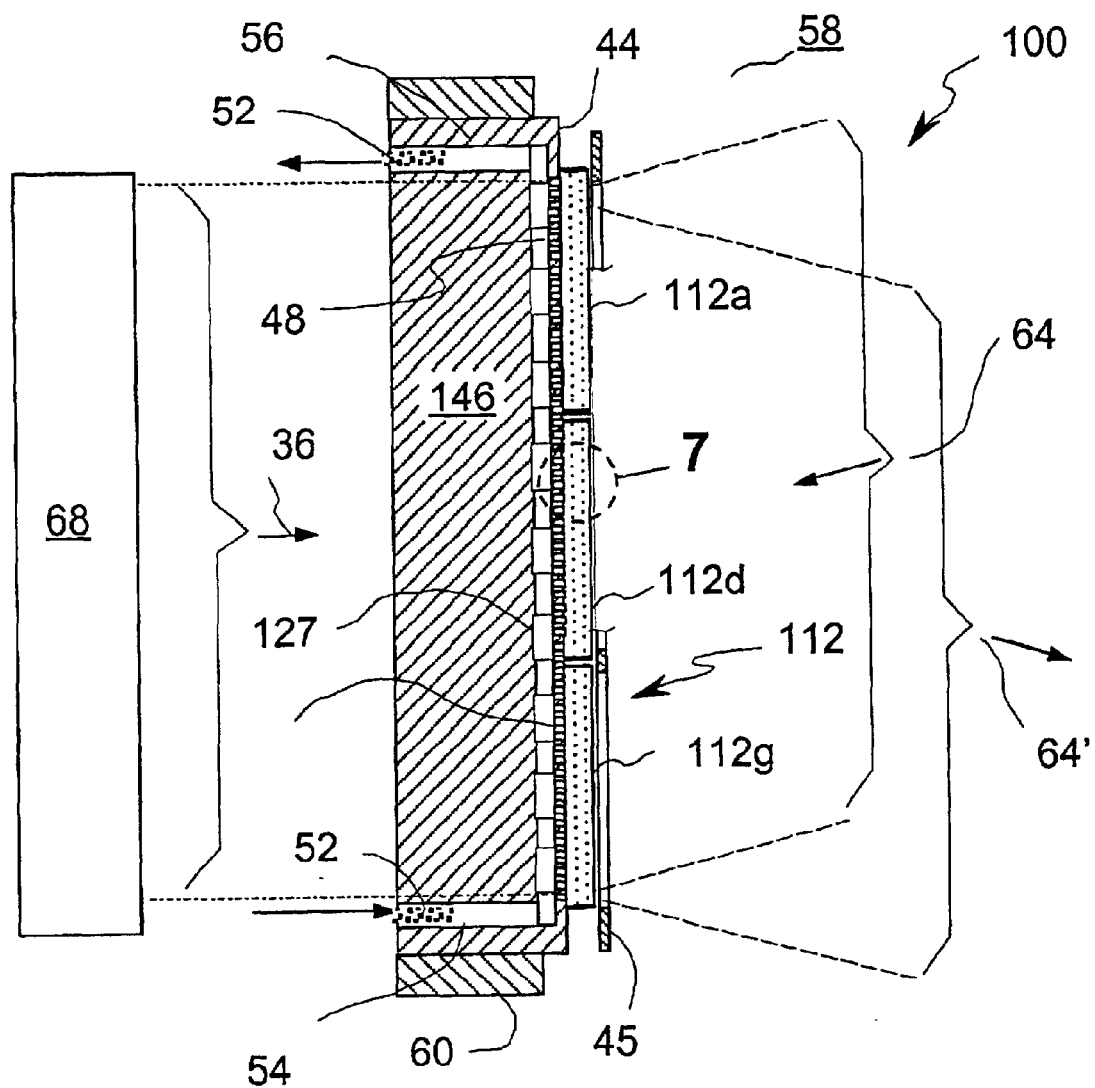
FIG. 6 is a side cross sectional view of an alternative embodiment of the active mirror amplifier module (AMA) of the present invention.
Figure 7:
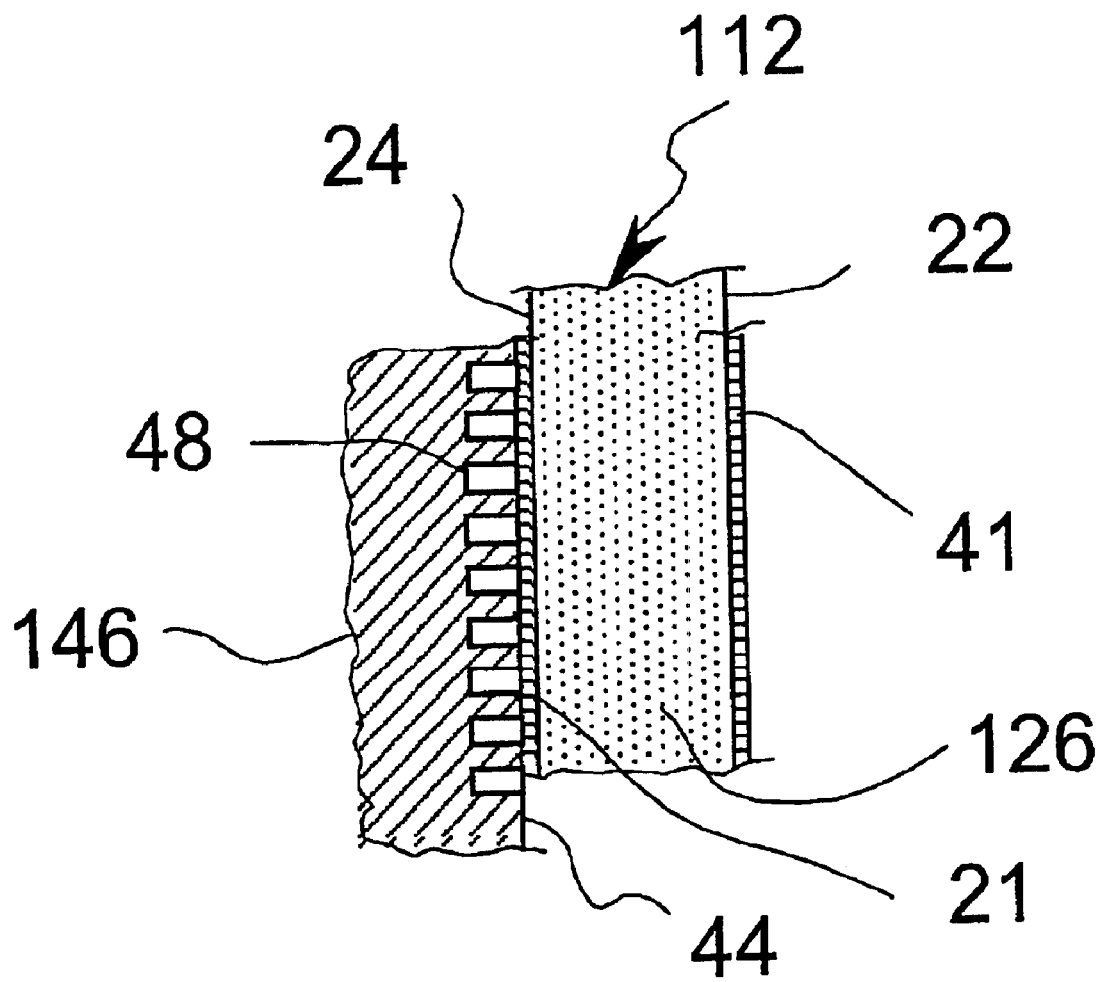
FIG. 7 shows an enlarged view of portion 7 of the AMA module of FIG. 6.

A second alternative preferred embodiment of the solid-state laser of the present invention is generally the same as the first preferred embodiment, except that it is adapted for injecting optical pump radiation into the back surface of the laser gain medium. Referring to FIG. 6, there is shown amplifier module 100 comprising substrate 146, six (6) composite gain media 112a–112g, and optical pump source 68. The composite gain media 112a–112g are generally the same as that described in connection with FIGS. 5a and 5b except that as illustrated in FIG. 7, the back planar surface 24 of disk 126 has an optical coating 21 with high reflectivity at the laser wavelength and being antireflective at the pump wavelengths, and the front surface 22 has an optical coating 41 that is antireflective at the laser wavelength and has high reflectivity at the pump wavelengths. The surface 24 is in contact with a surface 44 (with coating 21 therebetween) of the rigid substrate 146. The surface 44 contains an array of interconnected microchannels 48 of generally the same configuration as described in connection with FIG. 2 except that the coolant 52 is now flowing inside microchannels 48 where it is allowed to directly wet the back side 24 of the disk 126 and the optical coating 21 thereon. This arrangement allows the heat generated in composite gain media 112 to be conducted through the surface 24 and the optical coating 21 directly into the coolant 52. A distribution manifold 127 provides internal distribution of the coolant 52 to the microchannels 48 so as to provide a uniform cooling effect over a large part of the back surface 24 of the laser gain medium disk 126. Coolant 52 used with this embodiment of the invention is chosen to be optically transparent at the wavelengths of the optical pump radiation 36.

The substrate 146 is generally same as the substrate 46 of the first embodiment of the invention, but it is made of a material optically transparent to the pump radiation 36. A preferred material is fused silica or sapphire but other optical materials transparent to the pump radiation 36 and suitable for microchannel fabrication can be used. The thickness of the substrate 146 is chosen to provide mechanical rigidity necessary to assure that the surface 44 remains optically flat under operational conditions. The substrate 146 can be fabricated by ultrasonic machining of the microchannels 48 and the concomitant distribution channels into several plates of glass, crystal or other suitable material, and diffusion bonding the plates into a single monolithic unit. Such a fabrication process is currently used by the assignee of the present invention to fabricate high-power, actively-cooled optics. To reduce scattering losses of pump radiation 36, coolant 52 can be chosen to have an index of refraction nearly matched to that of the substrate 146. The invention can be also practiced with an antireflection coating applied to surface 44 to minimize back reflection of pump radiation 36.

During lasing, optical pump source 68 produces and directs collimated optical pump radiation 36 into the back surface 24 of the substrate 146. Since the substrate 146 and the coolant 52 are optically transparent at the pump radiation wavelengths, the pump radiation 36 is transported through them and through the optical coating 21 into the laser gain medium 126 of the composite gain media 112a–112g. The fraction of the pump radiation 36 not absorbed on the first pass through the laser gain medium 126 is reflected from the coating 41 and makes a second pass through the laser gain medium, this time in a generally reverse direction. Absorption of pump radiation 36 pumps the laser gain medium 126 to a laser transition. A key benefit provided by the second preferred embodiment of the invention is that the optical pump source 68 does not compete for space with laser beam 64 and 64'.

Figure 8:
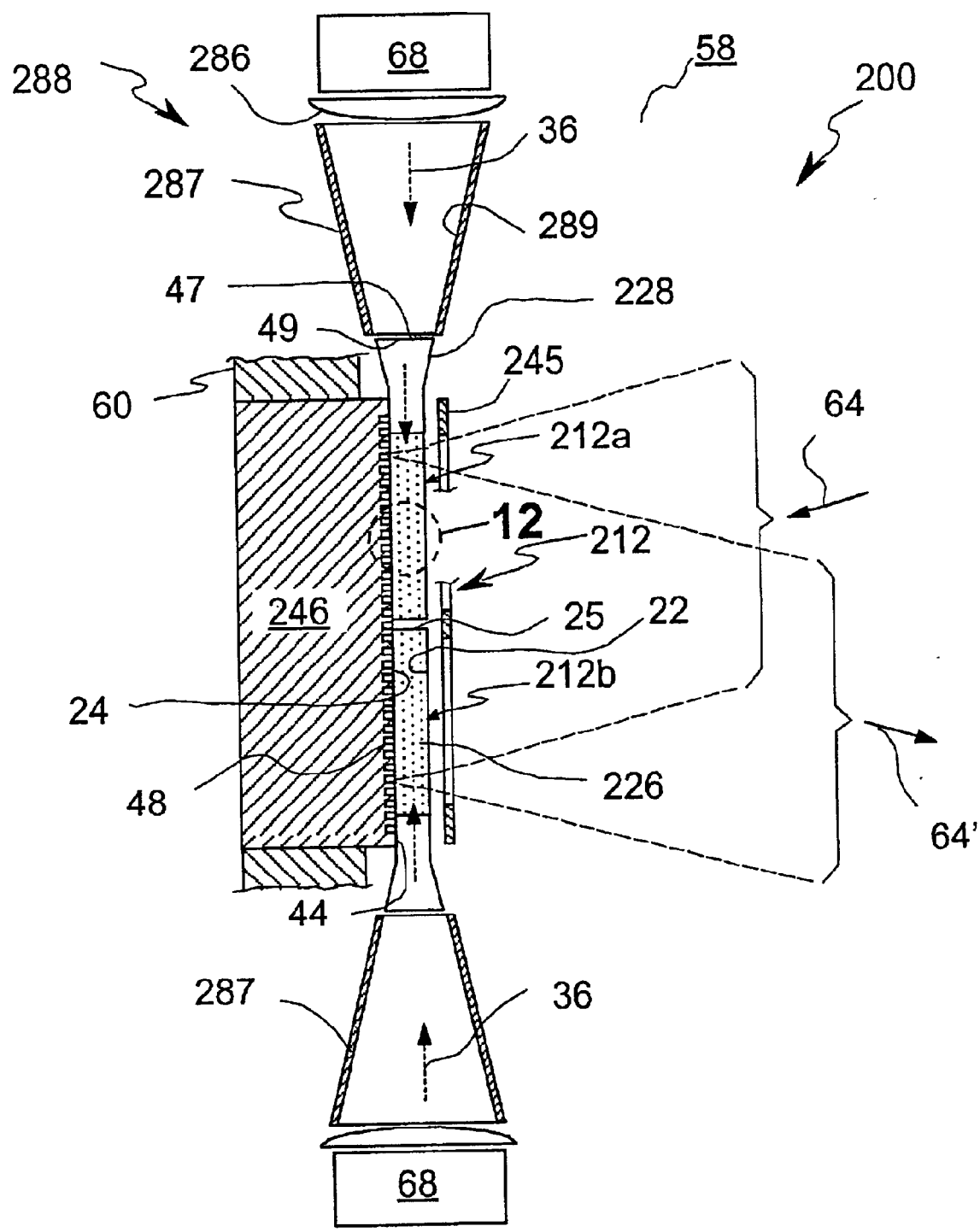
FIG. 8 is a side cross sectional view of another alternative preferred embodiment of the active mirror amplifier module (AMA) of the present invention.
Figure 9:
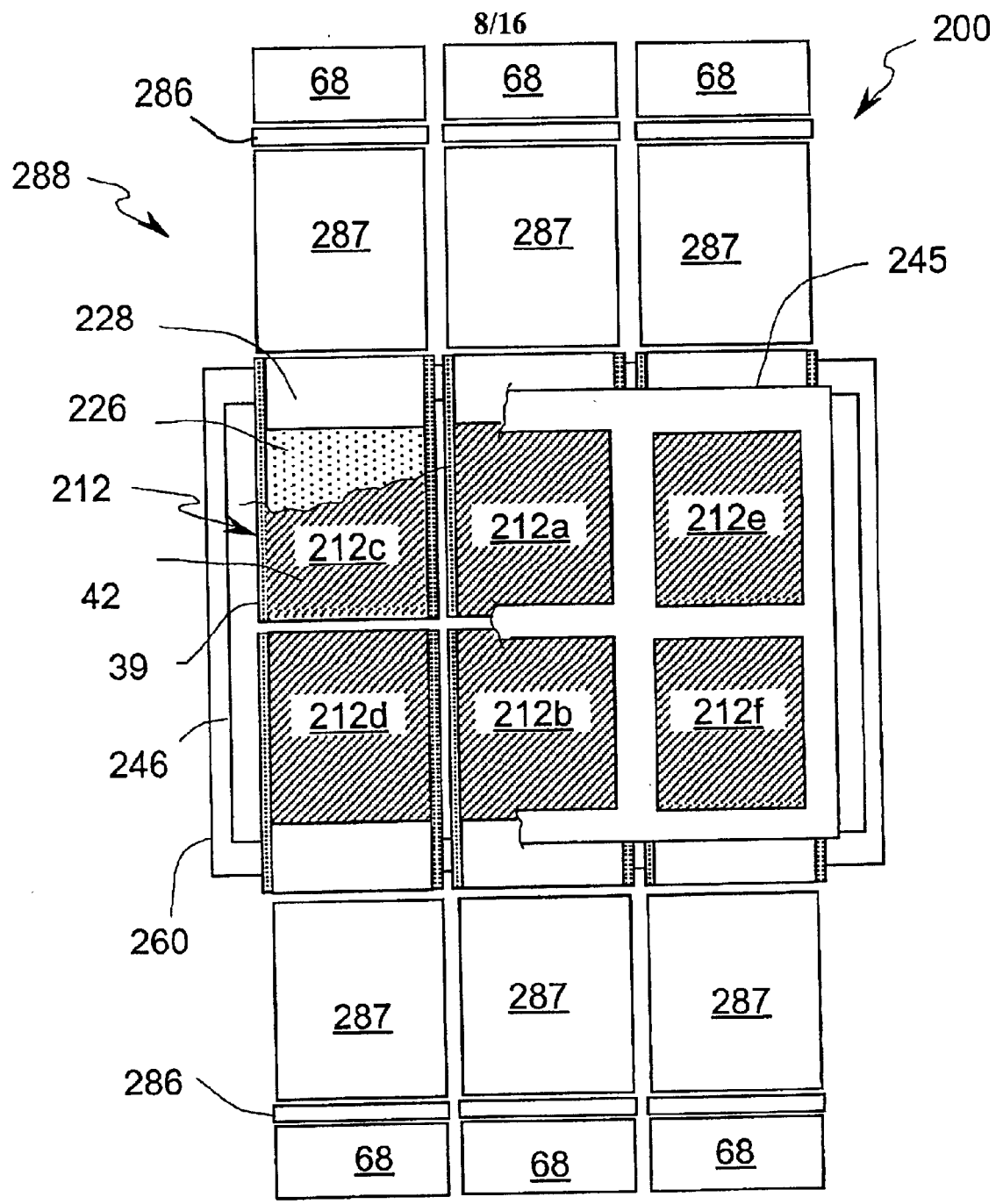
FIG. 9 is a front view of the AMA module of FIG. 8.

Referring to FIGS. 8 and 9, there is shown a solid-state active mirror amplifier module 200 in accordance with a third preferred embodiment of the present invention. The module 200 generally comprises substrate 246, multiple composite gain media 212, and multiple optical pump assemblies 288. The composite gain medium 212 is generally same as the composite medium 12 used in the first and second preferred embodiments of the subject invention except that it further incorporates an undoped medium. The gain medium assembly 212 is a thin disk or a plate having two planar, mutually parallel surfaces, a front surface 22 and a back surface 24, ground and polished to optical quality. The shape of the gain medium assembly 212 may vary widely but it is chosen so as to permit placing multiple gain medium assemblies 212 adjacent to each other with only small gaps therebetween. In one preferred configuration shown in FIG. 9, the module 200 uses six (6) composite gain media 212a–212g each having a rectangular shape.

Figure 10A:
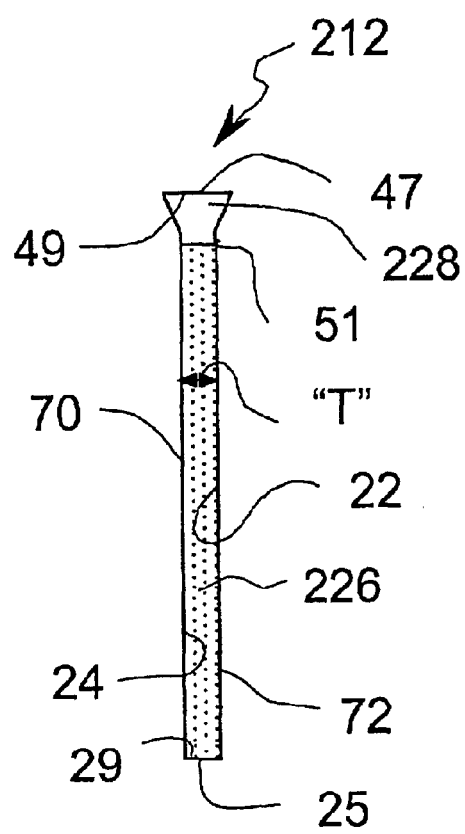
FIGS. 10a and 10b are enlarged side and cross-sectional views of the composite gain medium shown in FIG. 8.
Figure 10B:
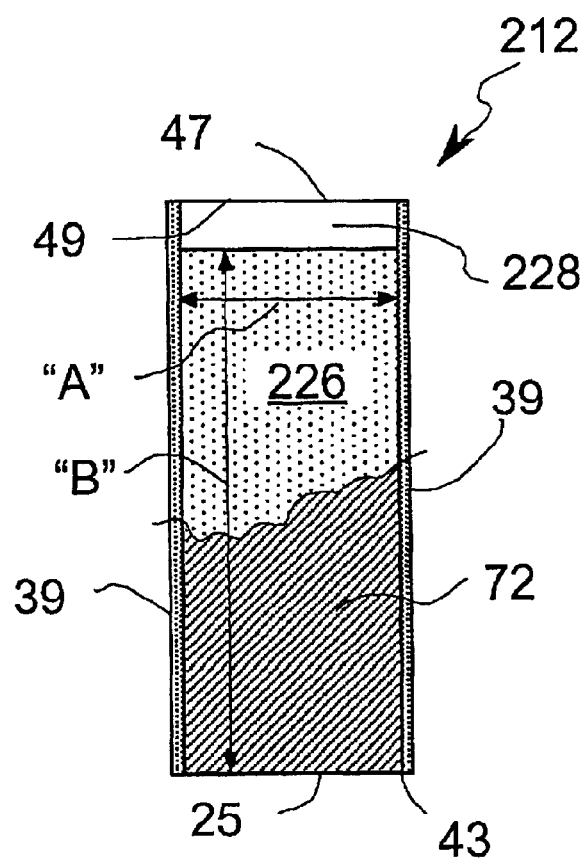

Referring now to FIGS. 10a and 10b, the composite gain medium 212 with a rectangular shape has transverse dimensions "A" and "B", each of which is several times greater than its thickness "T". Typically, the gain composite gain medium 212 may have a thickness ranging approximately from 1 mm to 10 mm and transverse dimensions ranging from about 10 mm to 150 mm. The composite gain medium 212 could just as readily be formed in other various shapes such as (but not limited to) polygonal shapes if desired. Preferably, the shape of the composite gain medium 212 is chosen so that multiple gain medium assemblies can be placed next to each other with only small gaps therebetween. The preferred gap size is less than 1 mm. Furthermore, while the use of the term "disk" is used herein to reference this component, it will be appreciated that the composite gain medium 212 may take other forms which might not be viewed, strictly speaking, as a "disk". The perimeter of each disk may be circular, elliptical, rectangular, polygonal, or formed by linear segments, or a combination of linear segments and curves. Boundaries of adjacent disks are chosen so that gaps between disks are minimized and disks efficiently cover most of the AMA optical aperture. Also, the number of gain medium assemblies can be quite arbitrary, typically ranging from one (1) to several hundreds.

Referring further to FIGS. 10a and 10b, the composite gain medium 212 comprises a laser gain medium 226, undoped optical medium 228, and ASE absorption cladding 39. The primary purpose of the undoped optical medium 228 is to transport optical pump radiation 36 (FIG. 8) into the laser gain medium 226. To improve such transport, the undoped optical medium 228 may be flared toward the pump radiation source and in this sense serve as a continuation of a duct 287 (FIG. 8). Surface 49 of undoped optical medium 228 can be curved to provide additional lensing effect. Furthermore, undoped optical medium 228 provides a heat conduction path to draw heat away from the edge of the laser gain medium 226 which reduces thermal stresses and distortions therein. In addition, the shape of the undoped optical material 228 can be chosen so as to trap such ASE rays and/or channel them outside the composite gain medium 212. By so reducing the feedback of ASE rays from the selected peripheral edge of composite gain medium 212, feedback mechanism for parasitic oscillations is largely eliminated and oscillations can be suppressed.

Figure 11:
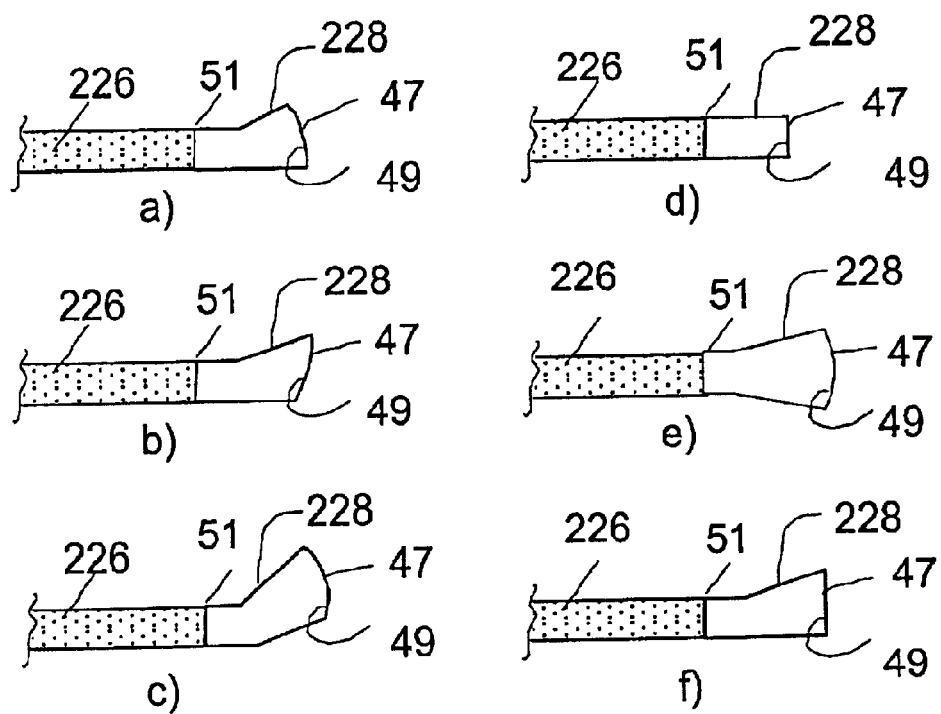
FIGS. 11a–11f show cross-sections of various alternative designs for the undoped optical medium which can be practiced with the present invention.

The undoped optical medium 228 is attached to the laser gain medium 226 via optical bond 51, which must be highly transparent to the optical pump radiation and laser radiation, and have a good thermal conductivity. Surface 49 that receives optical pump radiation 36 (FIG. 8) has a dielectric coating 47 which is antireflective at optical pump radiation wavelengths. Furthermore, the plane of the optical bond 51 can be machined at a slight angle of 1–5 degrees off normal to surface 22 to prevent direct feedback to ASE-driven parasitic oscillations. The preferred method for attaching the undoped optical medium 228 to the laser gain medium 226 is the already mentioned method of optical contacting followed by heat treatment, however, other suitable processes can be used. ASE absorption cladding 39 is attached to selected sides of the laser gain medium 226 via optical bond 43. Typical thickness of the ASE absorption cladding 39 is several millimeters. Optical bond 43 plane can be machined at a slight angle of 1–5 degrees to prevent direct reflection of ASE that could provide feedback for parasitic oscillations in the laser gain medium. FIG. 11 shows examples of several alternate cross-sections of undoped optical medium 228 which can be practiced with the invention.

Figure 12:
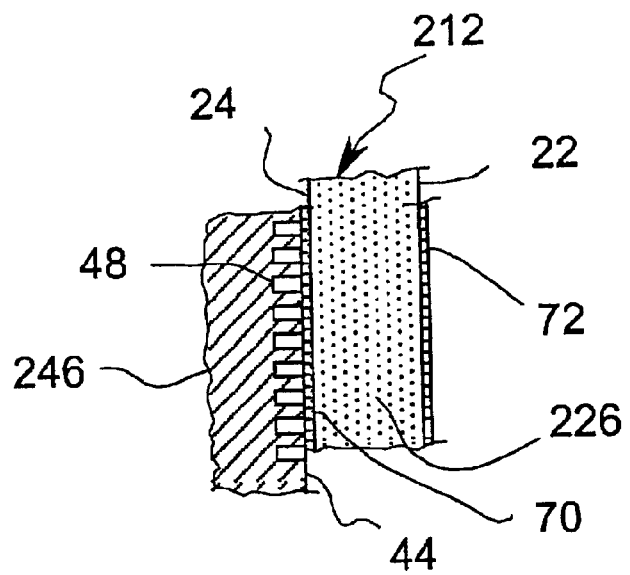
FIG. 12 is an enlarged view of portion 12 in FIG. 8.

Referring further to FIGS. 10a and 10b, surface 29 of the laser gain medium 226 has a coating 25 which is highly reflective at optical pump radiation wavelength. The purpose of the coating 25 is to reflect that part of optical radiation which is not absorbed during the first pass through the laser gain medium 226 and allow it to make a second pass. This provides more uniform pump power deposition in the laser gain medium 226 and more uniform laser gain. In addition to its already mentioned properties coating 25 can be also at least partially transmissive at laser gain wavelength, which would reduce reflection of ASE rays and reduce ASE losses. The front surface 22 of the composite gain medium 212 has an optical coating 72 that is antireflective at the laser wavelength. The back surface 24 of the composite gain medium 212 has an optical coating 70 with high reflectivity at a laser wavelength. Referring now also to FIG. 12, the back surface 24 is in contact with the surface 44 of the cooled, rigid substrate 246. The surface 44 contains an array of interconnected microchannels 48 extending generally over, but not beyond, the contact areas between the gain medium assemblies 212a–212g and the substrate 246.

Substrate 246 practiced with a third embodiment of the subject invention is of the same general construction and provides the same function as in the first preferred embodiment of the invention. The substrate 246 can either be cooled by an internal heat exchanger or provide coolant directly into the microchannels 48 which allows it to directly wet large portions of the back surface 24 of the composite gain medium 212. The latter is particularly suitable for operation at increased power density since the heat generated in the composite gain medium 212 is conducted through the surface 24 and the optical coating 70 directly into the coolant. Coolant pressure is substantially lower than the pressure of atmosphere 58 to assure a positive attachment of the composite gain media 212 to the substrate 246. Suitable coolants may include liquids such as deionized water, alcohol, members from the Freon® family, and liquid nitrogen, and certain liquid metals. Positive contact between the back surface 24 of composite gain medium assembly 212 and surface 44 of the substrate 246 is maintained by a pressure differential between the higher pressure of the atmosphere 58 surrounding the active mirror assembly and the lower pressure inside the microchannels 48.

Referring further to FIGS. 8 and 9, the optical pump assembly 288 comprises an optical pump source 68, cylindrical lens 286, and tapered hollow duct 287. During lasing, optical pump source 68, which preferably comprises an array of semiconductor laser diodes, produces and directs collimated optical pump radiation 36 into cylindrical lenses 286, which focus the radiation into the converging hollow ducts 287. Internal surfaces 289 of the ducts 287 are made highly reflective to the optical pump radiation. Aided by reflections from internal surfaces 289, the optical pump radiation 36 gradually increases in intensity as it progresses towards the tapered end of the duct 287. Optical pump radiation 36 exiting the tapered end of the duct 287 enters the optical medium 288 through surface 49 and it is transported therethrough into the laser gain medium 226. During passage through the laser gain medium 226 (generally in a direction parallel to the surface 22) the optical pump radiation 36 is gradually absorbed. This absorption process follows Beer's law described herein. The fraction of pump radiation 36 not absorbed after the first pass thorough the laser gain medium 226 is reflected from the coating 25 and makes a second pass through the laser gain medium 226, this time in a generally reverse direction. Preferably, the material of laser gain medium 226 is doped with absorbing species so that 90% or more of incident pump radiation 36 is absorbed in two passes through the laser gain medium 226.

When optical pump radiation is provided with sufficiently high intensity, a very large fraction of the laser ions in laser gain medium 226 will be in the excited state at any given time. This condition is known as "ground-state depletion." For example, see W. Krupke et al., Ground-state Depleted Solid-state Lasers; Principles, Characteristics and Scaling," in Optical and Quantum Electronics, 22, pp. S1–S22, 1990. When the third embodiment of the subject invention is pumped to the ground-state depleted condition, uniformity of laser gain across the entire aperture can be improved.

Optical radiation 36 absorbed by the laser gain medium 226 pumps the dopant species therein to a laser transition. This allows the laser gain medium 226 to serve as an amplifier of coherent optical radiation. The incident laser beam 64, having approximately the same footprint as the transverse shape of the array of composite gain media 212 covering the aperture of AMA module 200, enters the laser gain medium 226 at a generally normal incidence through front surface 22 and is amplified until it reaches the coating 70. On reflection from coating 70, the laser beam passes through the laser gain medium 226 again in a generally reverse direction. The amplified laser beam 64' exits the laser gain medium 226 in a direction generally normal to the front surface 22. Waste heat dissipated in the laser gain medium 226 is conducted to back surface 24 and through the coating 70, and transferred to surface 44 of the substrate 246 from which it is conducted to the heat exchanger. Because the contact surfaces 24 and 44 are of optical quality and are maintained in good contact by the pressure provided by the atmosphere 58, thermal resistance of the contact is very small. Thus the waste heat can be efficiently removed from the laser gain medium 226. Alternately, coolant may be provided directly to the microchannels 48 to directly wet the surface 24 as described herein. A mask 245 is located over the optical medium 228, ASE absorption cladding 39, and gaps between adjacent composite gain media 212 to avoid exposure to laser radiation 64 and to prevent the risk of consequential thermal damage. Preferably, such mask should be highly absorptive at the laser and pump wavelengths and may incorporate cooling channels to effectively dissipate absorbed heat.

Variations of Composite Gain Media Embodiment

In reference to FIGS. 13a and 13b, there is shown an alternate preferred embodiment of the composite gain medium 312 suitable for pumping from two opposite sides. The rectangular shape gain medium assembly 312 comprises two undoped optical media 328 attached the opposite edges of the laser gain medium 326 and ASE absorption cladding 39 attached to the other two edges. In this embodiment, optical pump radiation can be introduced into the laser gain medium 326 from two opposite sides, which is conducive to providing a more uniform power deposition thereinto.

Yet another alternate embodiment of the laser gain medium allows incorporation of multiple composite gain media into one unit. As an example, in reference FIGS. 14a and 14b, there is shown a rectangular shape gain medium assembly 412 comprising three (3) laser gain media 426a–426c, six (6) undoped optical media 428, and four (4) ASE absorption claddings 39 all bonded into one solid unit. As can be appreciated by those skilled in the art, a great variety of composite gain media can be adapted for use with the subject invention by bonding multiple laser gain media, undoped optical media, and ASE claddings.

The arrangement of composite gain media which can be practiced with the third embodiment of the subject invention is not limited only to rectilinear configurations. FIGS. 15a and 15b shows an AMA module 500 having an array of composite gain media 512 arranged in annular configuration symmetric about axis 561 and mounted side-by-side on a cooled substrate 546 to form a segmented annular aperture. Construction of suitable composite gain media 512 is shown in FIG. 16. By making proper choices of inner and outer diameter of the annular aperture and absorption characteristics of the laser gain medium 526 it is possible to obtain a uniform laser gain across large portions of the annular aperture. Alternate annular configuration suitable for increased power output and not shown in the figure may use two nested annular arrays of composite gain media.

Other General Variations of the Invention

Critical to proper operation of the subject invention is that the optical path for incident laser beam 64 is essentially same across the entire AMA module aperture. One way to accomplish such accuracy of optical path length is through close tolerance manufacturing when all of the laser gain media are fabricated with the same thickness within a small fraction of the laser wavelength, and precision mounted onto the substrate 46. Another approach is to allow the axial position of each composite gain medium 12 to be individually adjustable in the direction of the system optical axis (normal to surface 22) to compensate for any dissimilarities in the effective optical pathlength of each laser gain media. Such adjustment can be passive or by means of active servo system. An example of an AMA module where axial position of the composite gain media can be individually controlled is shown in FIG. 17. In this figure, an AMA module 600 employs two composite gain media 212a and 212b which are respectively placed on separate substrates 646a and 646b. Each of the substrates 646a and 646b is supported on an optical mount 660 respectively by actuators 692a and 692b, and 692c and 692d. Each of the actuators is capable of providing small, controlled movement in a direction of optical axis 61. When two adjacent actuators are moved in phase, they control axial position (also known as piston) of surface 24 of the corresponding composite gain media. When two adjacent actuators are moved out of phase, they control angular position (also known as tip) of surface 24 of the corresponding composite gain media with respect to optical axis 61. More complex control schemes are also possible. For example, with at three actuators per composite gain medium, one may control the piston, tip, and tilt (angular position transverse to tip) movements. Preferable actuator is of the piezo-electric type, but other suitable actuators may be also used. Actuator control can be provided to correctly position individual laser gain media prior to lasing and/or dynamically during lasing.

Alternate method for compensating for optical path length errors due to limitations in manufacturing of composite gain media provides phase front correction and control using adaptive optics also known as deformable mirror. Phase front correction techniques using deformable mirror are widely used in optical and laser industries. More information, see for example Chapter 3, Intracavity Laser Beam Control and Formation in "Laser Resonators: Novel Designs and Development," by A. Kudryashov and H. Weber, SPIE Optical Engineering Press, Bellingham, Wash. (1999). An example of a possible phase front control system suitable for use with the subject invention is shown in FIG. 18. In this figure laser beam 64 is directed to and amplified by AMA modules 702a and 702b. After module 702b the amplified beam 64' is beam is reflected from a deformable mirror 795 and directed to a beam splitter 797. The beam splitter 797 reflects a small portion of the beam 64' as a beam 64" which is focused by a lens 793 onto a detector 794. The detector may be CCD camera or a pinhole and a pyrosensor. Detector signal is amplified and provided to a computer 796 which uses a suitable algorithm to determine appropriate control signals which are then conveyed through a block of power drivers 798 into the actuators of the deformable mirror 795. This phase front control system is also very effective for compensating other laser phase front distortions which may be, for example, caused by laser gain medium inhomogenieties, residual transverse temperature gradients, as well as positioning and alignment errors. The system may be employed in a AMA laser oscillator directly within the optical cavity, or outside the cavity, or in an AMA amplifier chain.

Referring now to FIGS. 19*a*–19*g*, during normal operation, the front surface 22 of composite gain medium assembly disk 12 is relatively hot, while back surface 24 is relatively cold. Consequently, disk 12 experiences very high compression near front surface 22 and very high tension near back surface 24. If the disk was unconstrained, the resulting thermal stresses would distort (dish) the medium towards its cooler surface, as shown in FIG. 18*b*. In a constrained condition shown in FIG. 18*c*, the medium 12 is flat but experiences increased thermal stresses.

One approach that reduces thermal stresses under operational conditions is to pre-form disk 12 as shown in FIG. 19*d*. Prior to laser operation, the temperature of disk 12 is uniform. When in constrained condition, material near the front surface 22 experiences tension while the material near the back surface 24 experiences compression. However, during laser operation, the front surface 22 heats up while the back surface 24 remains relatively cool. This generally relieves tension near the front surface 22 and the compression near the back surface 24. It can be shown that this approach reduces stresses in the laser medium by about 50% and allows a corresponding increase in power. The tensile and compressive stresses experienced by the laser gain medium disk when constrained and unconstrained are illustrated in FIGS. 19*b*, 19*c*, 19*e*, 19*f* and 19*g*. FIG. 19*b* illustrates the increased tensile and compressive stresses when the disk 12 is unconstrained and FIG. 19*c* when it is constrained to a flat condition while at an operating temperature. FIGS. 19*f* and 19*g* illustrate the relief and possible reversal of tensile and compressive stresses when the pre-formed disk 12 is constrained to a flat condition and at an operating condition.

The already noted U.S. patents Meissner teach how to permanently bond optical surfaces even when one or both contact surfaces have optical coatings. Such technique may be used to bond surface 24 of the composite gain medium 12 to surface 44 of the rigid cooled substrate 46, with the optical coating 40 therebetween. Alternatively, with the proper choice of materials for coating 40 and substrate 46, composite gain medium 12 may either soldered or adhesively bonded to surface 44. One advantage of practicing the invention in this configuration is that the pressure differential required to clamp the composite gain medium 12 onto surface 44 may be significantly reduced or even eliminated. The same approach may be practiced with any of the other embodiments of the invention.

The subject invention is not restricted to laser gain medium with planar surfaces. Surface 44 of substrate 46 nominally assumed flat in the embodiments discussed thus far, could just as well be formed be a part of a spherical surface, or part of a surface of an ellipsoid, paraboloid, or hyperbolloid of revolution, or other suitable surface. In such case, the composite gain media are also formed so as to match the contour of surface 44.

The active mirror amplifier system of the subject invention can be operated in a continuous mode where the heat deposited into the laser gain medium 26 is removed in real time, or in a semi-continuous heat capacity mode where the laser gain medium 26 is allowed to gradually warm up to a predetermined limiting temperature. In the latter mode, when the laser gain medium 26 reaches a limiting temperature, the laser operation is suspended, and the medium is allowed to cool down by transferring its thermal energy to the cooling medium 52. When the temperature of the laser gain medium 26 has been substantially reduced, lasing operation can be resumed. During the lasing operation some of the heat deposited into the laser gain medium 26 may be removed concurrently, thereby extending the lasing operation.

Either of the active mirror amplifier modules described herein can be used to construct laser amplifiers as well as laser oscillators.

Those skilled in the art can now appreciate from the foregoing description that the broad teachings of the present invention can be implemented in a variety of forms. It will also be appreciated that the variations of the preferred embodiments in specific embodiments herein could readily be implemented in other ones of the embodiments. Therefore, while this invention has been described in connection with particular examples thereof, the true scope of the invention should not be so limited since other modifications will become apparent to the skilled practitioner upon a study of the drawings, specification and following claims.

What is claimed is:

1. A solid-state laser module for amplification of laser radiation comprising:

a substrate having a front surface and a back surface, said front surface of said substrate having a plurality of channels formed therein;

a plurality of discrete laser gain medium elements, each of said laser gain medium elements having a front surface, a back surface, and a peripheral edge surface, said back surfaces of said laser gain medium elements being in contact with said front surface of said substrate;

a source of optical pump radiation for directing optical pump radiation into said plurality of laser gain medium elements;

wherein said channels are maintained at a reduced pressure such that a pressure differential is created between said front surface and said back surface of each said laser gain medium to thereby maintain each said laser gain medium element secured against said front surface of said substrate;

wherein each of said plurality of laser gain medium elements are placed closely adjacent one another such that a peripheral edge of each is positioned closely adjacent a peripheral edge of another one of said laser gain medium elements;

wherein at least one of said laser gain medium elements has an optical coating on said back surface thereof to provide high reflectivity at a lasing wavelength of said laser gain medium elements;

wherein at least one of said laser gain medium elements has an optical coating on said front surface thereof, said coating being antireflective at a lasing wavelength of said laser gain medium element;

wherein said substrate is cooled;

wherein a material suitable for absorption of amplified spontaneous emission (ASE) is affixed to at least one part of a peripheral edge of at least one of said laser gain medium elements;

wherein at least two of said laser pain medium elements are bonded along their adjacent edges with said material suitable for absorption of amplified spontaneous emission therebetween; and wherein said bond is produced by a method chosen from a group consisting of fusion bonding, diffusion bonding, and optical contacting followed by a heat treatment.

2. The laser module of claim 1, further comprising a cooling medium flowing through said channels for cooling said laser gain medium elements.

3. The laser module of claim 1, wherein each said laser gain medium elements comprises a host lattice, and an undoped optical medium and wherein said host lattice and said undoped optical medium are selected from a group consisting of: yttrium aluminum garnet, gadolinium gallium garnet, gadolinium scandium gallium garnet, lithium yttrium fluoride, yttrium vanadate, phosphate glass, silicate glass, and sapphire.

4. The laser module of claim 3 wherein said host lattice is doped with a material selected from the group of: Ti, Cu, Co, Ni, Cr, Ce, Pr, Nd, Sm, Eu, Gd, Tb, Dy, Ho, Er, Tm and Yb.

5. The laser module of claim 1, wherein said source of optical pump radiation is comprised of at least one semiconductor diode laser.

6. The laser module of claim 1, wherein said optical pump radiation is directed into said front surface of at least one of said laser gain media elements.

7. The laser module of claim 1, wherein said substrate is fabricated from material transparent the wavelengths of said optical pump radiation; and wherein said optical pump radiation is injected through said substrate into said back surface of at least one of said laser gain media elements.

8. The laser module of claim 1 further including an undoped optical medium attached to said peripheral edge of said laser gain media elements;

wherein said optical pump radiation is directed into said undoped optical medium, said undoped optical medium transporting said optical pump radiation into an associated one of said laser gain media elements; and wherein said undoped optical medium is secured to said peripheral edge via a bond which is transparent at a wavelength of said optical pump radiation and a lasing wavelength of said laser gain media.

9. The laser module of claim 8, further comprising at least one tapered duct for concentration of said optical pump radiation, said tapered duct being interposed between said undoped optical medium and said source of optical pump radiation for directing said optical pump radiation toward said undoped optical medium.

10. The laser module of claim 1, wherein said laser gain medium comprises a non-planar shape.

11. A solid-state laser module comprising:

(a) a rigid substrate having a plurality of internal passages forming channels within a support surface of said rigid substrate, said passages leading up to the surface of said substrate and being maintained at a substantially lower pressure than an atmosphere in which said laser module is immersed;

(b) a plurality of discrete laser gain medium elements disposed closely adjacent one another and against said support surface, each of said laser gain medium elements effectively having a pair of surfaces having a first dimension, said pair of surfaces further being opposite to each other and being separated by a peripheral edge surface, each of said laser gain medium having a thickness representing a second dimension which is substantially smaller than said first dimension;

i) a first one of said pair of surfaces including an anti-reflection coating which is substantially totally transmissive of radiation at a wavelength at which laser gain is produced therein;

ii) said second one of said pair of surfaces including a coating which is substantially reflective of radiation at a laser gain wavelength;

iii) said second one of said pair of surfaces being disposed against said support surface of said substrate and maintained so by a pressure differential between pressure in said passages and said atmosphere in which said laser module is immersed;

at least one source of optical pump radiation directing optical pump radiation into at least one of said laser gain medium elements;

wherein a material suitable for absorption of amplified spontaneous emission (ASE) is affixed to at least one part of a peripheral edge of at least one of said laser pain medium elements:

wherein at least two of said laser pain medium elements are bonded along their adjacent edges with said material suitable for absorption of amplified spontaneous emission therebetween: and wherein said bond is produced by a method chosen from a group consisting of fusion bonding, diffusion bonding, and optical contacting followed by a heat treatment.

12. The laser module of claim 11, wherein said pressure differential is sufficiently high for said laser gain media to conform to the shape of said support surface.

13. The laser module of claim 11, wherein said substrate is cooled.

14. The laser module of claim 11, further comprising a cooling medium flowing through said channels for cooling at least one of said laser gain medium elements.

15. The laser module of claim 11, wherein said at least one source of optical pump radiation is arranged for directing optical pump radiation into at least one said peripheral edge of at least one of said laser gain medium elements.

16. The laser module of claim 15 further comprising at least one at least one tapered optical duct disposed between at least one of said sources of optical pump radiation and said peripheral edge, said tapered optical duct concentrating said optical pump radiation into said peripheral edge of said at least one laser gain medium element.

17. The module as in claim 15, further comprising at least one undoped optical medium affixed to said peripheral edge of said laser gain medium elements via an optically transparent bond, said undoped optical medium conveying said optical pump radiation into said peripheral edge.

18. The laser module of claim 11, wherein said sources are arranged for directing optical pump radiation into the first surface of said pair of surfaces of at least one of said laser gain medium elements.

19. The laser module of claim 11, wherein said sources are arranged for directing optical pump radiation into the first surface of said pair of surfaces of at least one of said laser gain medium elements.

20. The laser module of claim 15 further comprising at least one lensing element disposed between said at least one source of optical pump radiation and said peripheral edge, said lensing element concentrating said optical pump radiation into said peripheral edge of said laser gain medium.

21. A solid-state laser module for amplification of laser radiation comprising:
 a substrate having a front surface and a back surface, said front surface of said substrate having a plurality of channels formed therein;
 a plurality of laser gain medium elements, each of said laser gain medium elements having a front surface, a back surface and a peripheral edge surface, said back surfaces of said laser gain medium elements being in contact with said front surface of said substrate;
 a source of optical pump radiation for directing optical pump radiation into said plurality of laser gain medium elements;
 wherein said channels are maintained at a pressure such that a pressure differential is created between said front surface and said back surface of each said laser gain medium element to thereby maintain each said laser gain medium element secured against said front surface of said substrate;
 wherein each of said plurality of laser gain medium elements are placed closely adjacent one another such that a peripheral edge of each is positioned closely adjacent a peripheral edge of another one of said laser gain medium elements; and
 wherein at least one of said laser gain medium elements has an optical coating on said back surface thereof to provide high reflectivity at a lasing wavelength of said laser gain medium elements;
 wherein at least one of said laser gain medium elements has an optical coating on said front surface thereof, said coating being antireflective at a lasing wavelength of said laser gain medium element;
 wherein at least two of said laser gain medium elements are bonded along their adjacent edges with said material suitable for absorption of amplified spontaneous emission therebetween; and
 wherein said bond is produced by a method chosen from a group consisting of fusion bonding, diffusion bonding, and optical contacting followed by a heat treatment.

22. The laser module of claim 21, further comprising a cooling medium flowing through said channels for cooling said laser gain medium elements.

23. The laser module of claim 21, wherein material suitable for absorption of amplified spontaneous emission (ASE) is affixed to at least one part of a peripheral edge of at least one of said laser gain medium elements.

24. The laser module of claim 23, wherein said material suitable for absorption of amplified spontaneous emission is affixed to said edge by means chosen from the group consisting of adhesive bonding, diffusion bonding, fusion bonding, and optical contacting following by heat treatment.

25. The laser module of claim 21 further including an comprising:
 at least one tapered duct for concentration of said optical pump radiation, said tapered duct being interposed between said undoped optical medium and said source of optical pump radiation for directing said optical pump radiation toward said undoped optical medium;
 an undoped optical medium attached to said peripheral edge of said laser gain medium elements;
 wherein said optical pump radiation is directed into said undoped optical medium, said undoped optical medium transporting said optical pump radiation into an associated one of said laser gain media elements; and
 wherein said undoped optical medium is secured to said peripheral edge via a bond which is transparent at a wavelength of said optical pump radiation and a lasing wavelength of said laser gain media.

26. The laser module of claim 21 wherein each said laser gain medium elements comprises a host lattice and an undoped optical medium and wherein said host lattice and said undoped optical medium are selected from a group consisting of: yttrium aluminum garnet, gadolinium gallium garnet, gadolinium scandium gallium garnet, lithium yttrium fluoride, yttrium vanadate, phosphate glass, silicate glass and sapphire.

27. The laser module of claim 26 wherein said host lattice is doped with a material selected from a group of: Ti, Cu, Co, Ni, Cr, Ce, Pr, Nd, Sm, Eu, Gd, Tb, Dy, Ho, Er, Tm and Yb.

28. A solid-state laser module comprising:
 (a) a rigid substrate having a plurality of internal passages forming channels within a support surface of said rigid substrate, said passages leading up to the surface of said substrate and being maintained at a substantially lower pressure than an atmosphere in which said laser module is immersed;
 (b) a plurality of laser gain medium elements disposed closely adjacent one another and against said support surface, each of said laser gain medium elements effectively having a pair of surfaces having a first dimension, said pair of surfaces further being opposite to each other and being separated by a peripheral edge surface, each of said laser gain medium elements having a thickness representing a second dimension which is substantially smaller than said first dimension;
  i) a first one of said pair of surfaces including an anti-reflection coating which is substantially transmissive of radiation at a wavelength at which laser gain is produced therein;
  ii) said second one of said pair of surfaces including a coating which is substantially reflective of radiation at a laser gain wavelength;
  iii) said second one of said pair of surfaces being disposed against said support surface of said substrate and maintained so by a pressure differential between pressure in said passages and said atmosphere in which said laser module is immersed;
 at least one source of optical pump radiation directing optical pump radiation into at least one of said laser gain medium elements;
 wherein at least two of said laser gain medium elements are bonded along their adjacent edges with said material suitable for absorption of amplified spontaneous emission therebetween.

* * * * *

UNITED STATES PATENT AND TRADEMARK OFFICE
CERTIFICATE OF CORRECTION

PATENT NO. : 6,810,060 B2  Page 1 of 1
DATED : October 26, 2004
INVENTOR(S) : Vetrovec It is certified that error appears in the above-identified patent and that said Letters Patent is hereby corrected as shown below:

Column 5,
Line 9, after "13b" delete "a".
Line 25, after "16b" delete "a".

Column 18,
Line 48, insert -- reduced -- after first occurrence of "a".
Line 51, insert -- element -- after first occurrence of "medium".

Column 19,
Line 5, "pain" should be -- gain --.

Column 20,
Line 5, after "medium" insert -- elements --.
Line 27, "pain" should be -- gain --.
Line 62, claim 19 should read as follows:
-- The laser module of claim 11, wherein said substrate is fabricated from material transparent at the wavelengths of said optical pump radiation; and
wherein said sources are arranged for directing optical pump radiation through said substrate into the second surface of said pair of surfaces of at least one of said laser gain medium elements. --

Signed and Sealed this

Third Day of May, 2005

JON W. DUDAS
*Director of the United States Patent and Trademark Office*